US012572002B2

(12) United States Patent
Kikuchi

(10) Patent No.: US 12,572,002 B2
(45) Date of Patent: Mar. 10, 2026

(54) ZOOM LENS AND IMAGE PICKUP APPARATUS INCLUDING THE SAME

(71) Applicant: CANON KABUSHIKI KAISHA, Tokyo (JP)

(72) Inventor: Shohei Kikuchi, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/498,083

(22) Filed: Oct. 31, 2023

(65) Prior Publication Data

US 2024/0061223 A1    Feb. 22, 2024

Related U.S. Application Data

(63) Continuation of application No. 16/666,554, filed on Oct. 29, 2019, now Pat. No. 11,841,488.

(30) Foreign Application Priority Data

Nov. 2, 2018    (JP) ................................. 2018-207200

(51) Int. Cl.
 *G02B 15/14* (2006.01)
 *G02B 27/64* (2006.01)
(52) U.S. Cl.
 CPC ....... *G02B 15/1461* (2019.08); *G02B 27/646* (2013.01)
(58) Field of Classification Search
 CPC ........ G02B 15/1461; G02B 15/145105; G02B 15/145113; G02B 15/145121; G02B 15/145129
 See application file for complete search history.

(56) References Cited

U.S. PATENT DOCUMENTS 6,061,186 A * 5/2000 Nishio ........... G02B 15/145113
                                                          359/683
9,207,438 B2 12/2015 Hatada
 (Continued)

FOREIGN PATENT DOCUMENTS

CN      102162905 A    8/2011
JP      H10333039 A    12/1998
 (Continued)

OTHER PUBLICATIONS

Gross et al. "Handbook of Optical Systems vol. 3: Aberration Theory and Correction of Optical Systems" Weinheim Germany, WILEY-VCH Verlag GmbH & Co. KGaA, pp. 377-379 (Year: 2007).*

(Continued)

*Primary Examiner* — Cara E Rakowski
(74) *Attorney, Agent, or Firm* — Carter, DeLuca & Farrell LLP

(57) ABSTRACT

A zoom lens according to the present invention includes, in order from an object side to an image side, first to third lens units with positive, negative and positive refractive powers, and a rear group including two or more lens units, in which an interval between adjacent lens units is varied during zooming. The zoom lens includes a correction lens unit which has a function of moving an imaging position in a direction perpendicular to an optical axis. The correction lens unit includes, in order from the object side to the image side, a positive first subunit, a positive second subunit which moves in a direction having a component of the direction perpendicular to the optical axis, and a negative third subunit. Focal lengths of the zoom lens when focused at infinity at a wide angle end and the correction lens unit are appropriately set.

12 Claims, 16 Drawing Sheets

(56) References Cited

U.S. PATENT DOCUMENTS

| | | | |
|---|---|---|---|
| 9,310,589 B2 | 4/2016 | Wakazono et al. | |
| 9,323,033 B2 | 4/2016 | Kawana | |
| 9,678,317 B2 | 6/2017 | Kikuchi | |
| 9,904,044 B2 | 2/2018 | Kikuchi et al. | |
| 2005/0083584 A1 | 4/2005 | Ito et al. | |
| 2007/0002443 A1 | 1/2007 | Toyama | |
| 2010/0046074 A1 | 2/2010 | Wada | |
| 2010/0289926 A1 | 11/2010 | Tanaka | |
| 2011/0205636 A1 | 8/2011 | Ito | |
| 2013/0215518 A1* | 8/2013 | Mitsuhashi | G02B 15/145129 |
| | | | 359/683 |
| 2013/0235466 A1* | 9/2013 | Iwamoto | G02B 15/173 |
| | | | 359/683 |
| 2014/0098426 A1* | 4/2014 | Tanaka | G02B 15/20 |
| | | | 359/684 |
| 2016/0109692 A1 | 4/2016 | Shibata | |
| 2017/0261728 A1 | 9/2017 | Shibata | |
| 2018/0017770 A1 | 1/2018 | Kon | |
| 2018/0017771 A1* | 1/2018 | Kawamura | G02B 27/646 |
| 2018/0284407 A1* | 10/2018 | Iwasawa | G02B 27/0025 |
| 2019/0004295 A1* | 1/2019 | Hatada | G02B 15/173 |
| 2019/0041607 A1 | 2/2019 | Bito | |
| 2019/0101727 A1 | 4/2019 | Yuki et al. | |
| 2019/0101732 A1 | 4/2019 | Yuki et al. | |
| 2019/0278068 A1* | 9/2019 | Hatada | G02B 15/1461 |
| 2020/0341249 A1* | 10/2020 | Ito | G02B 15/145113 |
| 2020/0341251 A1* | 10/2020 | Machida | G02B 13/18 |

FOREIGN PATENT DOCUMENTS

| | | | |
|---|---|---|---|
| JP | 2002107629 A | 4/2002 | |
| JP | 2004252204 A | 9/2004 | |
| JP | 2007010903 A | 1/2007 | |
| JP | 2011-128364 A | 6/2011 | |
| JP | 2014228811 A | 12/2014 | |
| JP | 2014238549 A | 12/2014 | |
| WO | 2016157339 A1 | 10/2016 | |
| WO | 2018074413 A1 | 4/2018 | |
| WO | 2020157903 A1 | 8/2020 | |
| WO | 2020157904 A1 | 8/2020 | |
| WO | 2020157905 A1 | 8/2020 | |
| WO | 2020157906 A1 | 8/2020 | |

OTHER PUBLICATIONS

Notice of Reasons for Refusal issued by the Japan Patent Office on Oct. 25, 2022 in corresponding JP Patent Application No. 2018-207200, with English translation.

Notification of the First Office Action issued by the China National Intellectual Property Administration on Jun. 10, 2021 in corresponding CN Patent Application No. 201911033893.9, with English translation.

Communication issued by the European Patent Office on Apr. 29, 2021 in corresponding EP Patent Application No. 19206561.3.

Extended European Search Report issued by the European Patent Office on Mar. 30, 2020 in corresponding European Patent Application No. 19206561.3.

Notice of Reasons for Refusal issued by the Japan Patent Office on Aug. 2, 2022 in corresponding JP Patent Application No. 2018-207200, with English translation.

* cited by examiner

Fno= 4.12
-0.500    0.500
SPHERICAL
ABERRATION
g    d

ω= 41.3°
-0.500    0.500
ASTIGMATISM
S    M

ω= 41.3°
-10.000    10.000
DISTORTION (%)

ω= 41.3°
-0.100    0.100
CHROMATIC
ABERRATION
g

Fno= 5.06
-0.500    0.500
SPHERICAL
ABERRATION
d
g

ω= 16.3°
-0.500    0.500
ASTIGMATISM
M    S

ω= 16.3°
-10.000    10.000
DISTORTION (%)

ω= 16.3°
-0.100    0.100
CHROMATIC
ABERRATION
g

Fno= 6.41
-0.500    0.500
SPHERICAL
ABERRATION
g    d

ω= 5.87°
-0.500    0.500
ASTIGMATISM
S
M

ω= 5.87°
-10.000    10.000
DISTORTION (%)

ω= 5.87°
-0.100    0.100
CHROMATIC
ABERRATION
g

Fno= 4.12

-0.500    0.500
SPHERICAL
ABERRATION

ω= 41.3°

-0.500    0.500
ASTIGMATISM

ω= 41.3°

-10.000    10.000
DISTORTION (%)

ω= 41.3°

-0.100    0.100
CHROMATIC
ABERRATION

Fno= 5.66

-0.500    0.500
SPHERICAL
ABERRATION

ω= 16.2°

-0.500    0.500
ASTIGMATISM

ω= 16.2°

-10.000    10.000
DISTORTION (%)

ω= 16.2°

-0.100    0.100
CHROMATIC
ABERRATION

Fno= 6.41

-0.500    0.500
SPHERICAL
ABERRATION

ω= 5.87°

-0.500    0.500
ASTIGMATISM

ω= 5.87°

-10.000    10.000
DISTORTION (%)

ω= 5.87°

-0.100    0.100
CHROMATIC
ABERRATION

IMAGE HEIGHT
15mm 0.100

-0.100

IMAGE HEIGHT
0mm 0.100

-0.100

IMAGE HEIGHT
-15mm 0.100

-0.100

ZOOM LENS AND IMAGE PICKUP APPARATUS INCLUDING THE SAME

CROSS REFERENCE TO RELATED APPLICATIONS

This application is a continuation of U.S. patent application Ser. No. 16/666,554, filed on Oct. 29, 2019, which claims the benefit of and priority to Japanese Patent Application No. 2018-207200, filed Nov. 2, 2018, each of which is hereby incorporated by reference herein in their entirety.

FIELD OF THE INVENTION

The present invention relates to a zoom lens and an image pickup apparatus including the zoom lens. The present invention is particularly suitable as an image pickup optical system of an image pickup apparatus such as a still camera, video camera, digital still camera, and monitoring camera.

DESCRIPTION OF THE RELATED ART

A zoom lens used for an image pickup apparatus with an image pickup element has been required to be small in entire size and have a high zoom ratio and high resolution (high optical performance). Especially in these years, the zoom lens has been required to have high optical performance with substantially uniform resolution from the center to the periphery of the screen.

The zoom lens has been also required to include a mechanism (image stabilization mechanism) to compensate blurring of a picture image (image blurring) that occurs when accidental vibration such as hand shake is propagated to the zoom lens. In response, a positive lead type zoom lens in which a lens unit with a positive refractive power is arranged closest to an object side has been known as the zoom lens meeting the requirements. For the positive lead type zoom lens, known is a zoom lens having an image stabilization function of compensating image blurring by moving a partial lens system (image stabilization unit) (image blurring correction unit) in a direction having a component of a direction perpendicular to an optical axis.

Japanese Patent Application Laid-Open No. 2014-228811 discloses a zoom lens of a five-unit configuration consisting of a first lens unit with a positive refractive power, a second lens unit with a negative refractive power, a third lens unit with a positive refractive power, a fourth lens unit with a negative refractive power, and a fifth lens unit with a negative refractive power, which are arranged in order from an object side to an image side. In this zoom lens, the third lens unit includes three subunits all having positive refractive powers. The zoom lens corrects image blurring by moving the second subunit from the object side in a vertical direction.

U.S. Pat. No. 9,207,438 discloses a zoom lens consisting of a first lens unit with a positive refractive power, a second lens unit with a negative refractive power, a third lens unit with a negative refractive power, a fourth lens unit with a positive refractive power, and a fifth lens unit with a positive refractive power, which are arranged in order from an object side to an image side. In this zoom lens, the fourth lens unit consists of a subunit with a positive refractive power and a subunit with a negative refractive power. The zoom lens corrects image blurring by using the subunit with the negative refractive power.

In a case where an image blurring correction unit for image blurring correction is moved in the direction perpendicular to the optical axis for image blurring correction, the image blurring correction unit is required to have a small size and a light weight in order to downsize a movement mechanism (image stabilization mechanism) and achieve power saving. It is also required that aberration, especially chromatic aberration, is less varied in the image blurring correction and that good optical performance is maintained in the image blurring correction, for example.

In a zoom lens in which a partial lens system is used as an image blurring correction unit and is offset parallel to the direction perpendicular to an optical axis to correct image blurring, correction of image blurring is relatively easy. However, unless the zoom lens and the image blurring correction unit to be moved in the image blurring correction have proper lens configurations, an amount of decentering aberration is increased in the image blurring correction. This may cause a large degradation of the optical performance in the image blurring correction and increase of aberrations of a zoom lens achieving a high zoom ratio. Thus, it is important for a zoom lens having a high zoom ratio and an image blurring correction function to properly set the entire zoom configuration, the lens configuration of the image blurring correction unit, and the like.

For example, it is important to properly set the number of the lens units forming the zoom lens, a sign of a refractive power of each lens unit, selection of a lens unit to be moved during zooming, the lens configuration of the image blurring correction unit, and the like.

SUMMARY OF THE INVENTION

An object of the present invention is to provide a zoom lens that is small in entire size, has a high zoom ratio, corrects aberration variation in image blurring correction well, and obtains high optical performance in image blurring correction.

The zoom lens according to the present invention is a zoom lens including a plurality of lens units in which an interval between adjacent lens units is varied during zooming. The zoom lens includes a first lens unit with a positive refractive power, a second lens unit with a negative refractive power, a third lens unit with a positive refractive power and a rear group including two or more lens units, arranged in order from an object side to an image side. A correction lens unit which is one of the plurality of lens units includes a first subunit with a positive refractive power, a second subunit with a positive refractive power which is configured to move in a direction having a component of a direction perpendicular to an optical axis during image blurring correction, and a third subunit with a negative refractive power, arranged in order from the object side to the image side. The zoom lens satisfies the following conditional expression:

$$0.01 < fxyz/fw < 4.55$$

where fw is a focal length of the zoom lens when focused at infinity at a wide angle end and fxyz is a focal length of the correction lens unit.

Further features of the present invention will become apparent from the following description of exemplary embodiments with reference to the attached drawings.

BRIEF DESCRIPTION OF THE DRAWINGS

FIG. 1B is an aberration diagram of the zoom lens of Example 4 at an intermediate zoom position.

DESCRIPTION OF THE EMBODIMENTS

Preferable embodiments of the present invention are described below with reference to the accompanying drawings.

A zoom lens of the present invention includes a plurality of lens units in which an interval between adjacent lens units is varied during zooming. The plurality of lens units include a first lens unit with a positive refractive power, a second lens unit with a negative refractive power, a third lens unit with a positive refractive power, and a rear group including at least one or at least two lens units, which are arranged in order from an object side to an image side. One of the lens units forming the zoom lens has a function of moving an imaging position in a direction perpendicular to an optical axis. That is, the lens unit has a function of correcting image blurring due to hand shake and the like. The lens unit with such a function is referred to as a correction lens unit in the following descriptions.

The correction lens unit includes a first subunit with a positive refractive power, a second subunit with a positive refractive power that is movable in a direction having a component of a direction perpendicular to the optical axis, and a third subunit with a negative refractive power, which are arranged in order from the object side to the image side. The second subunit functions as a subunit for image blurring correction, thereby the correction lens unit has a function of moving the imaging position in a direction perpendicular to the optical axis.

Figure 1:
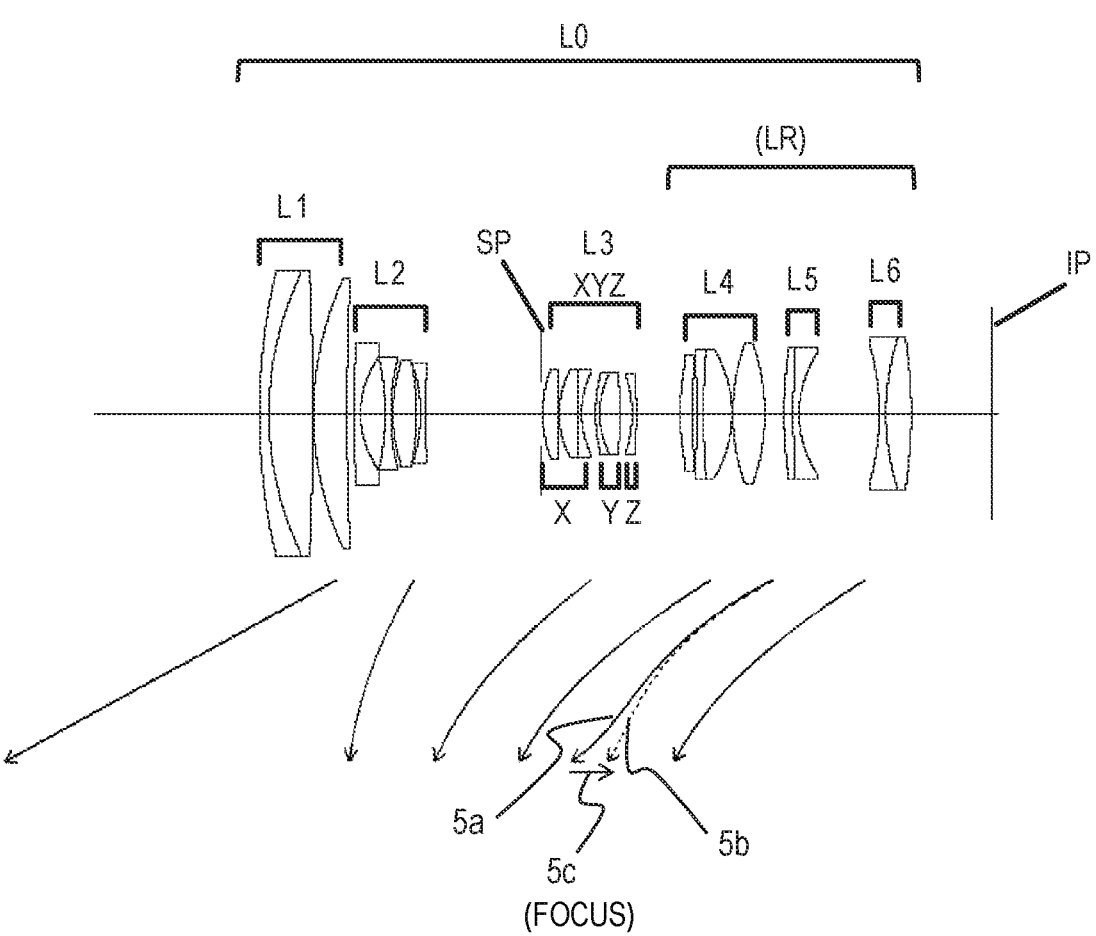
FIG. 1 is a lens cross-sectional view in a zoom lens of Example 1 at a wide angle end.
Figure 2:
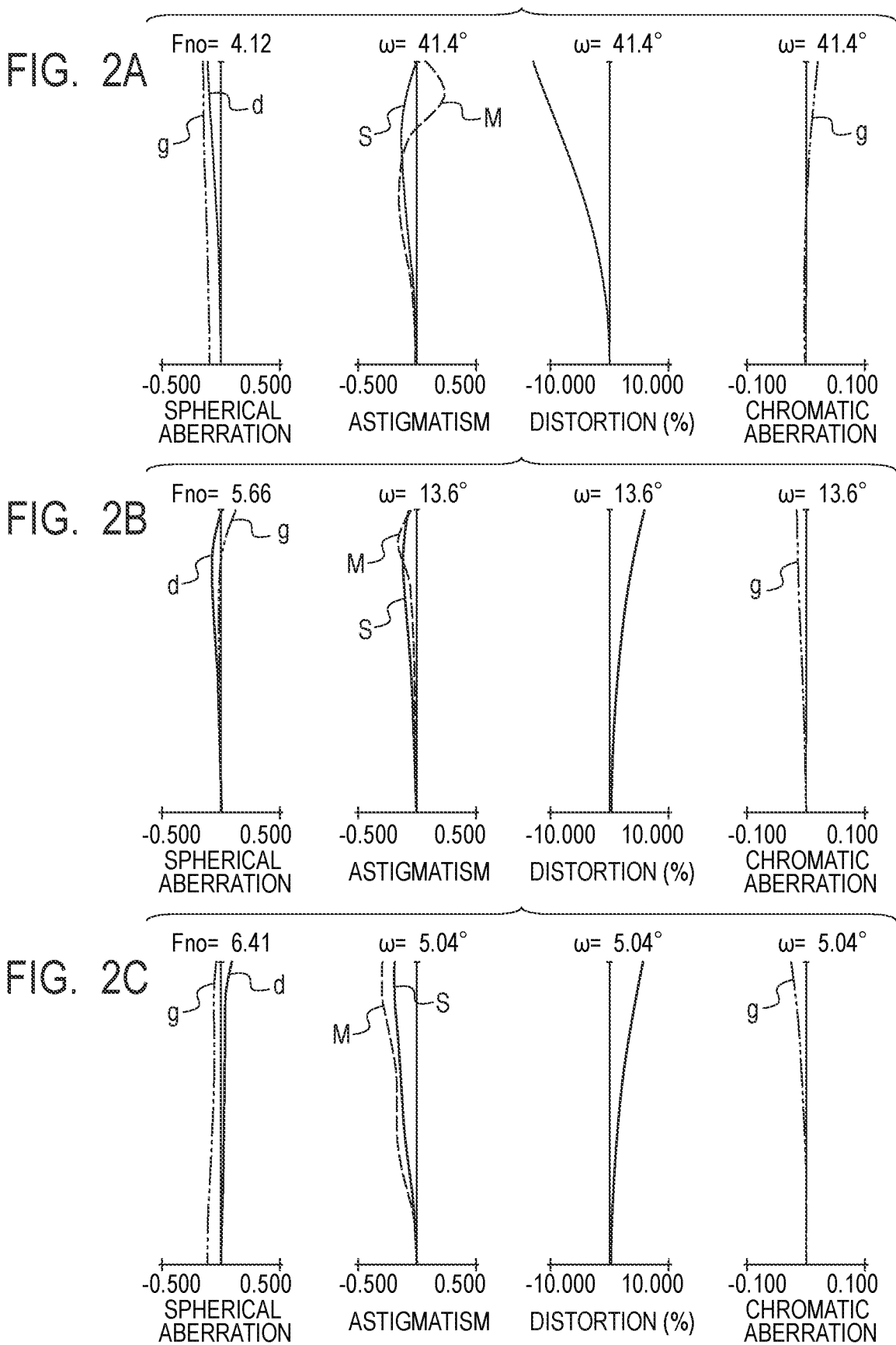
FIG. 2A is an aberration diagram of the zoom lens of Example 1 at the wide angle end.
FIG. 2B is an aberration diagram of the zoom lens of Example 1 at an intermediate zoom position.
FIG. 2C is an aberration diagram of the zoom lens of Example 1 at a telephoto end.
Figure 3:
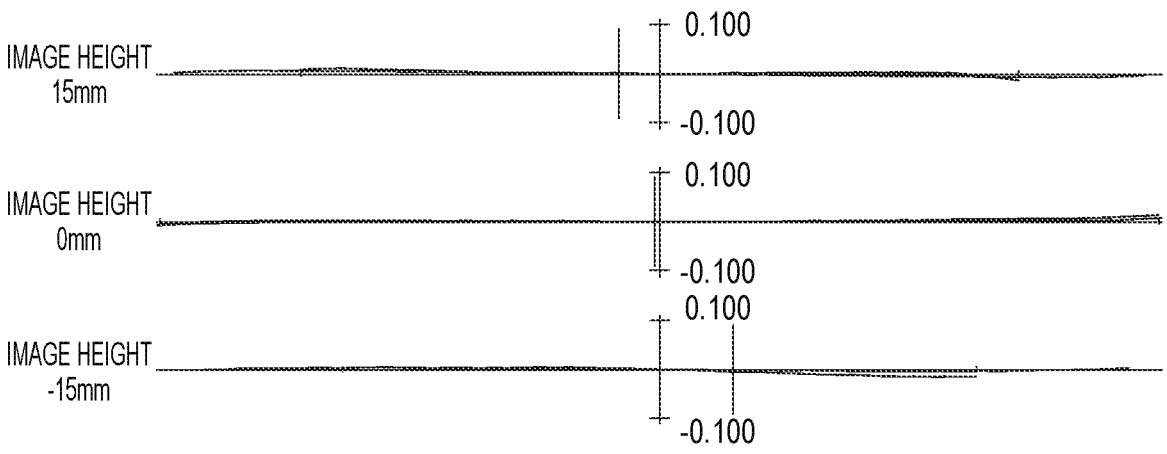
FIG. 3 is an aberration diagram of the zoom lens of Example 1 in image blurring correction at the telephoto end.

FIG. 1 is a lens cross-sectional view of the zoom lens of Example 1 of the present invention when focused at infinity at a wide angle end. FIGS. 2A, 2B, and 2C are longitudinal aberration diagrams of the zoom lens of Example 1 when focused at infinity at the wide angle end, an intermediate zoom position, and a telephoto end, respectively. FIG. 3 is a transverse aberration diagram after correction in which the second subunit for image blurring correction is moved by 0.509 mm in the zoom lens of Example 1 when focused at infinity at the telephoto end. This movement amount of the second subunit is obtained when the later-described numerical data is expressed in mm. The same applies in all the following examples. The zoom lens of Example 1 has a zoom ratio of 9.42 and F-number of 4.12 to 6.41.

Figure 4:
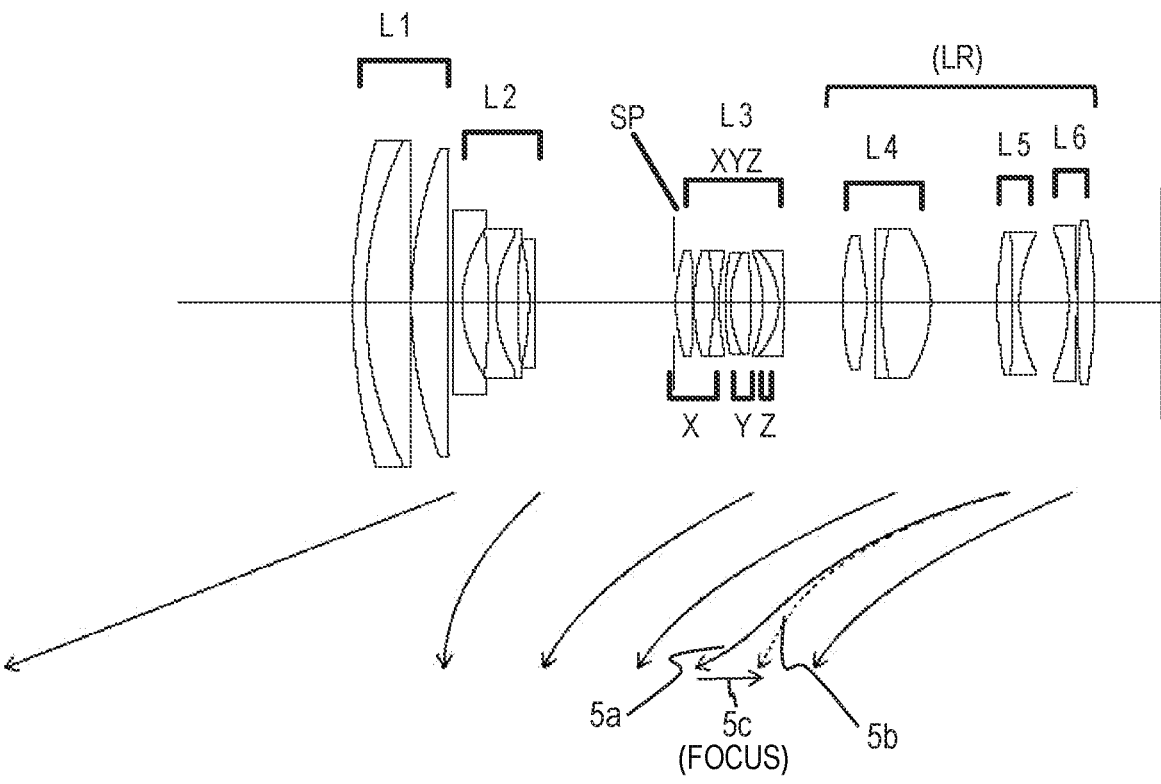
FIG. 4 is a lens cross-sectional view in a zoom lens of Example 2 at a wide angle end.
Figure 5:
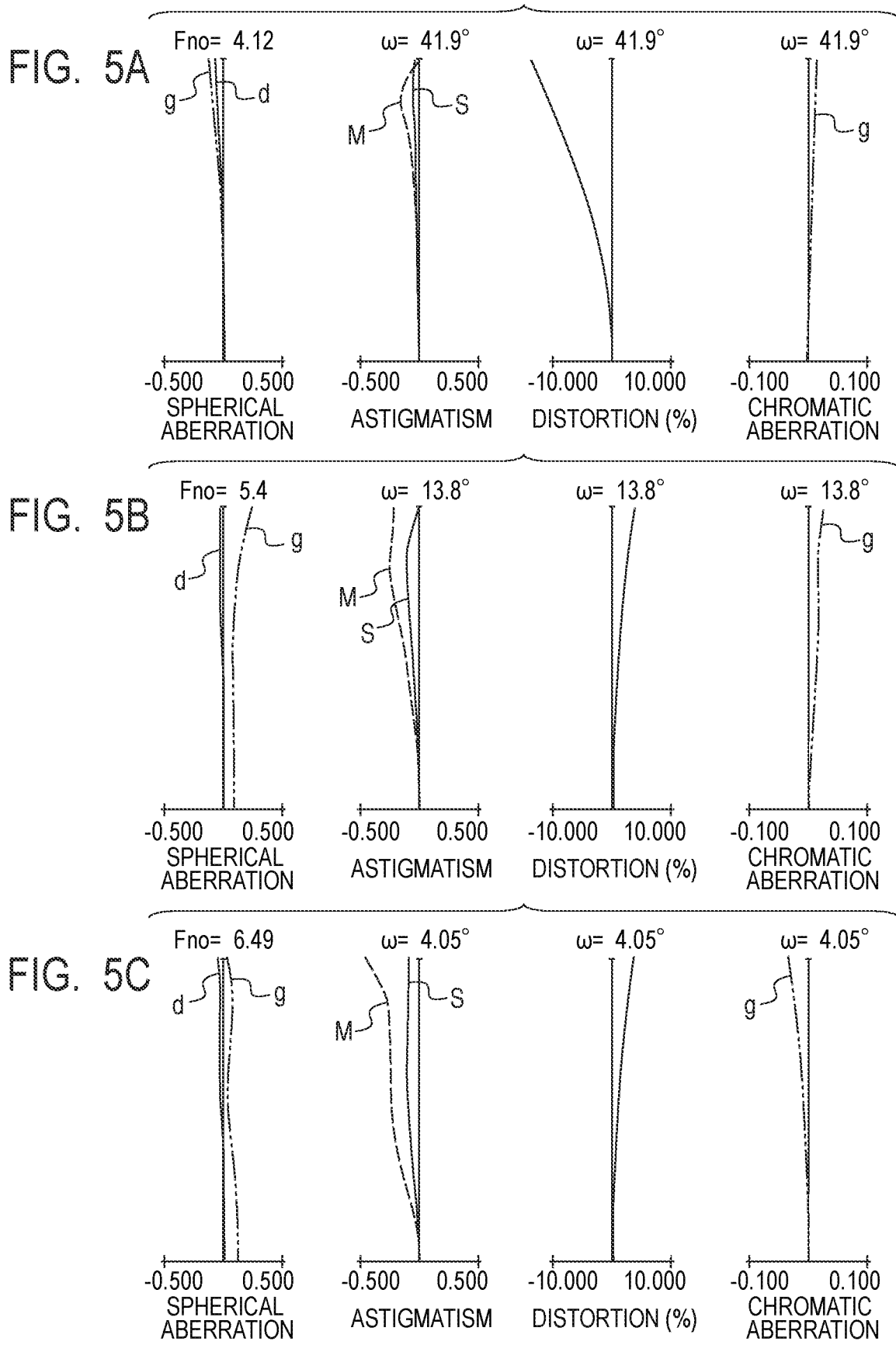
FIG. 5A is an aberration diagram of the zoom lens of Example 2 at the wide angle end.
FIG. 5B is an aberration diagram of the zoom lens of Example 2 at an intermediate zoom position.
FIG. 5C is an aberration diagram of the zoom lens of Example 2 at a telephoto end.
Figure 6:
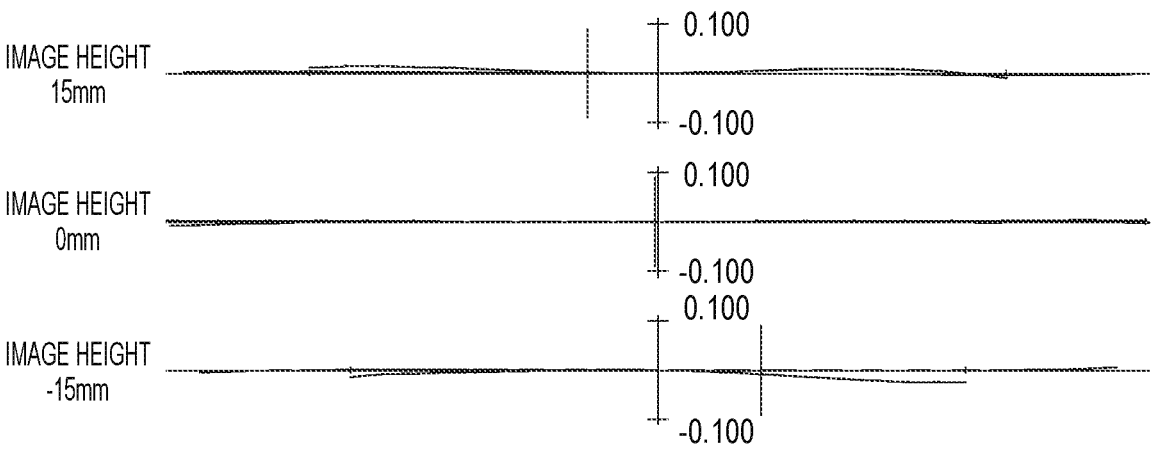
FIG. 6 is an aberration diagram of the zoom lens of Example 2 in image blurring correction at the telephoto end.

FIG. 4 is a lens cross-sectional view of the zoom lens of Example 2 of the present invention when focused at infinity at a wide angle end. FIGS. 5A, 5B, and 5C are longitudinal aberration diagrams of the zoom lens of Example 2 when focused at infinity at the wide angle end, an intermediate zoom position, and a telephoto end, respectively. FIG. 6 is a transverse aberration diagram after correction in which the second subunit for image blurring correction is moved by 0.771 mm in the zoom lens of Example 2 when focused at infinity at the telephoto end. The zoom lens of Example 2 has a zoom ratio of 12.14 and F-number of 4.12 to 6.49.

Figure 7:
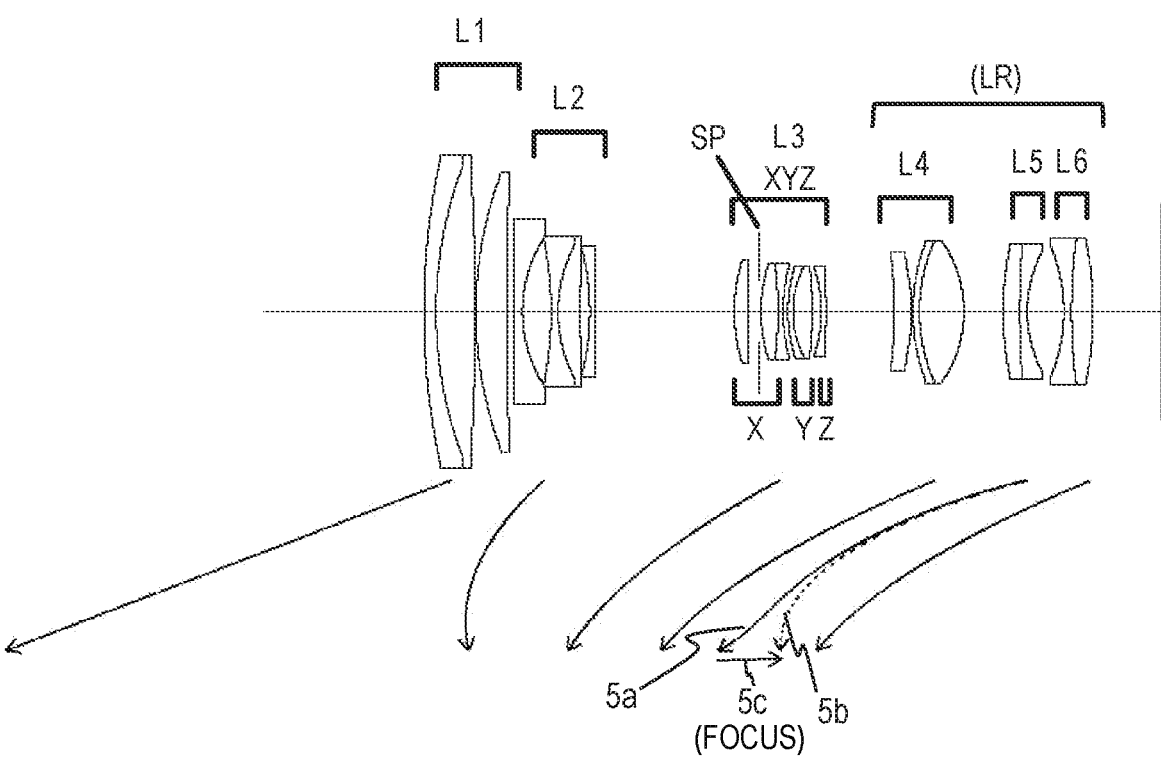
FIG. 7 is a lens cross-sectional view in a zoom lens of Example 3 at a wide angle end.
Figure 8:
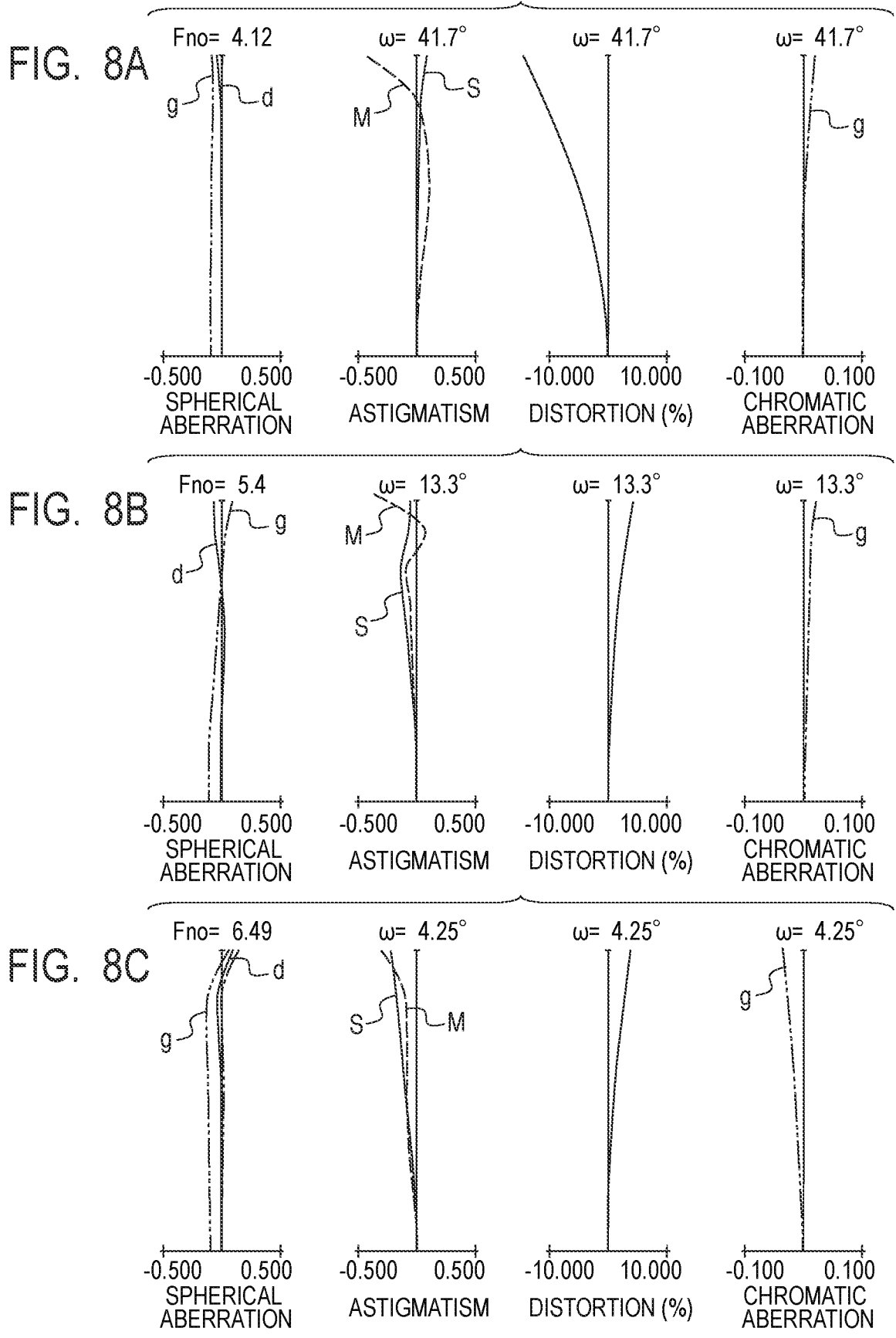
FIG. 8A is an aberration diagram of the zoom lens of Example 3 at the wide angle end.
FIG. 8B is an aberration diagram of the zoom lens of Example 3 at an intermediate zoom position.
FIG. 8C is an aberration diagram of the zoom lens of Example 3 at a telephoto end.
Figure 9:
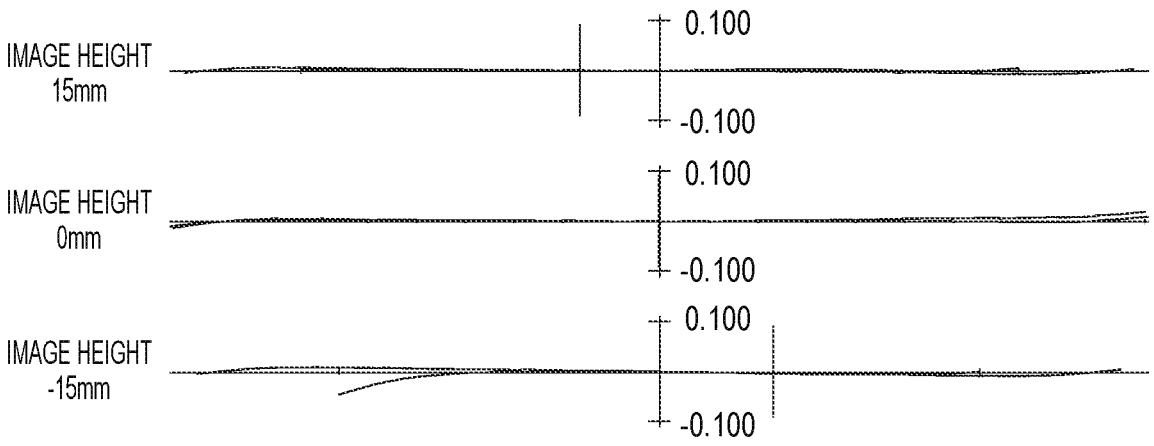
FIG. 9 is an aberration diagram of the zoom lens of Example 3 in image blurring correction at the telephoto end.

FIG. 7 is a lens cross-sectional view of the zoom lens of Example 3 of the present invention when focused at infinity at a wide angle end. FIGS. 8A, 8B, and 8C are longitudinal aberration diagrams of the zoom lens of Example 3 when focused at infinity at the wide angle end, an intermediate zoom position, and a telephoto end, respectively. FIG. 9 is a transverse aberration diagram after correction in which the second subunit for image blurring correction is moved by 0.734 mm in the zoom lens of Example 3 when focused at infinity at the telephoto end. The zoom lens of Example 3 has a zoom ratio of 11.33 and F-number of 4.12 to 6.49.

Figure 10:
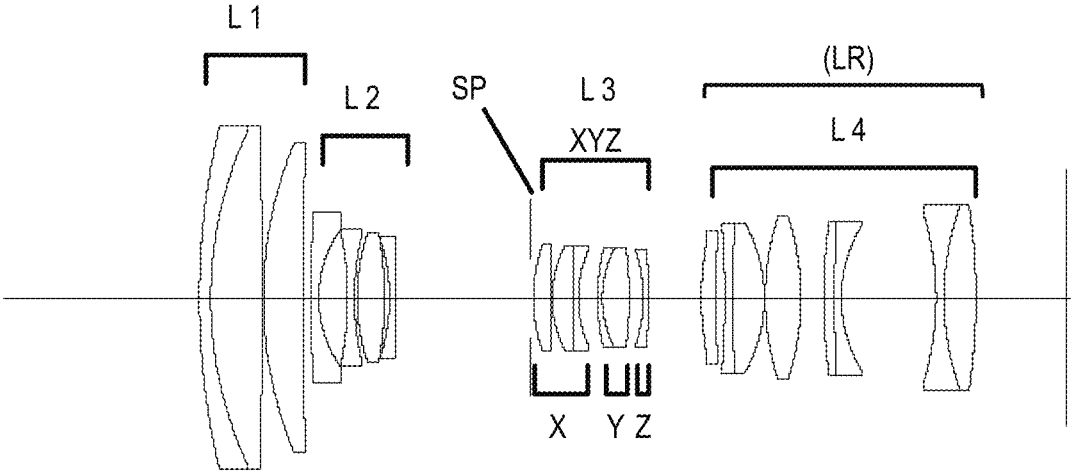
FIG. 10 is a lens cross-sectional view in a zoom lens of Example 4 at a wide angle end.
Figures 11A, 11B, 11C:
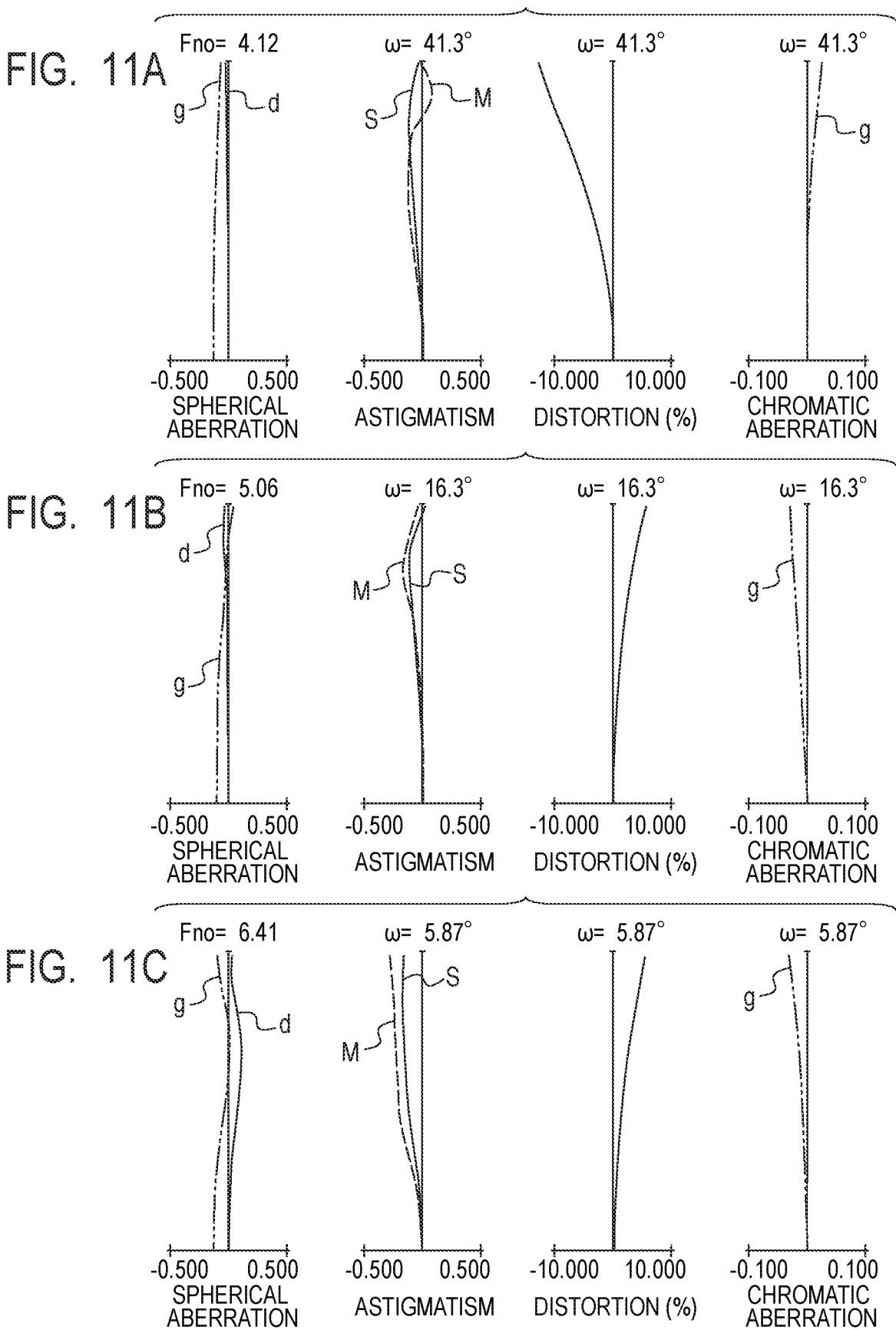
FIG. 11A is an aberration diagram of the zoom lens of Example 4 at the wide angle end.
FIG. 11C is an aberration diagram of the zoom lens of Example 4 at a telephoto end.
Figure 12:
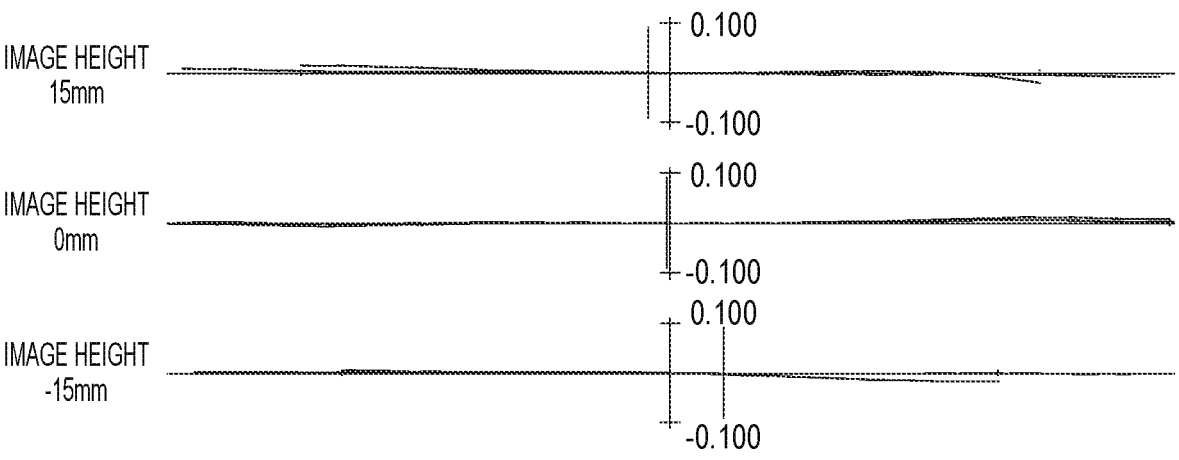
FIG. 12 is an aberration diagram of the zoom lens of Example 4 in image blurring correction at the telephoto end.

FIG. 10 is a lens cross-sectional view of the zoom lens of Example 4 of the present invention when focused at infinity at a wide angle end. FIGS. 11A, 11B, and 11C are longitudinal aberration diagrams of the zoom lens of Example 4 when focused at infinity at the wide angle end, an intermediate zoom position, and a telephoto end, respectively. FIG. 12 is a transverse aberration diagram after correction in which the second subunit for image blurring correction is moved by 0.430 mm in the zoom lens of Example 4 when focused at infinity at the telephoto end. The zoom lens of Example 4 has a zoom ratio of 8.09 and F-number of 4.12 to 6.41.

Figure 13:
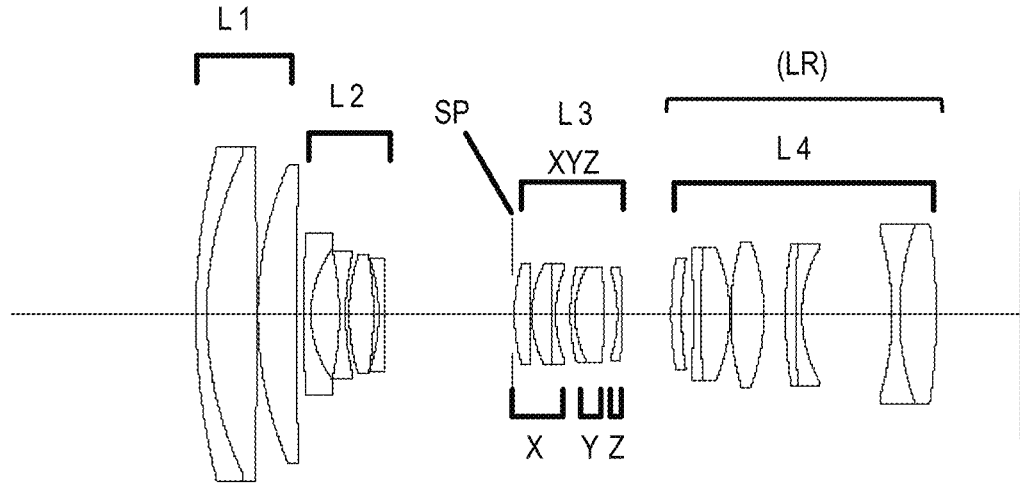
FIG. 13 is a lens cross-sectional view in a zoom lens of Example 5 at a wide angle end.
Figures 14A, 14B, 14C:
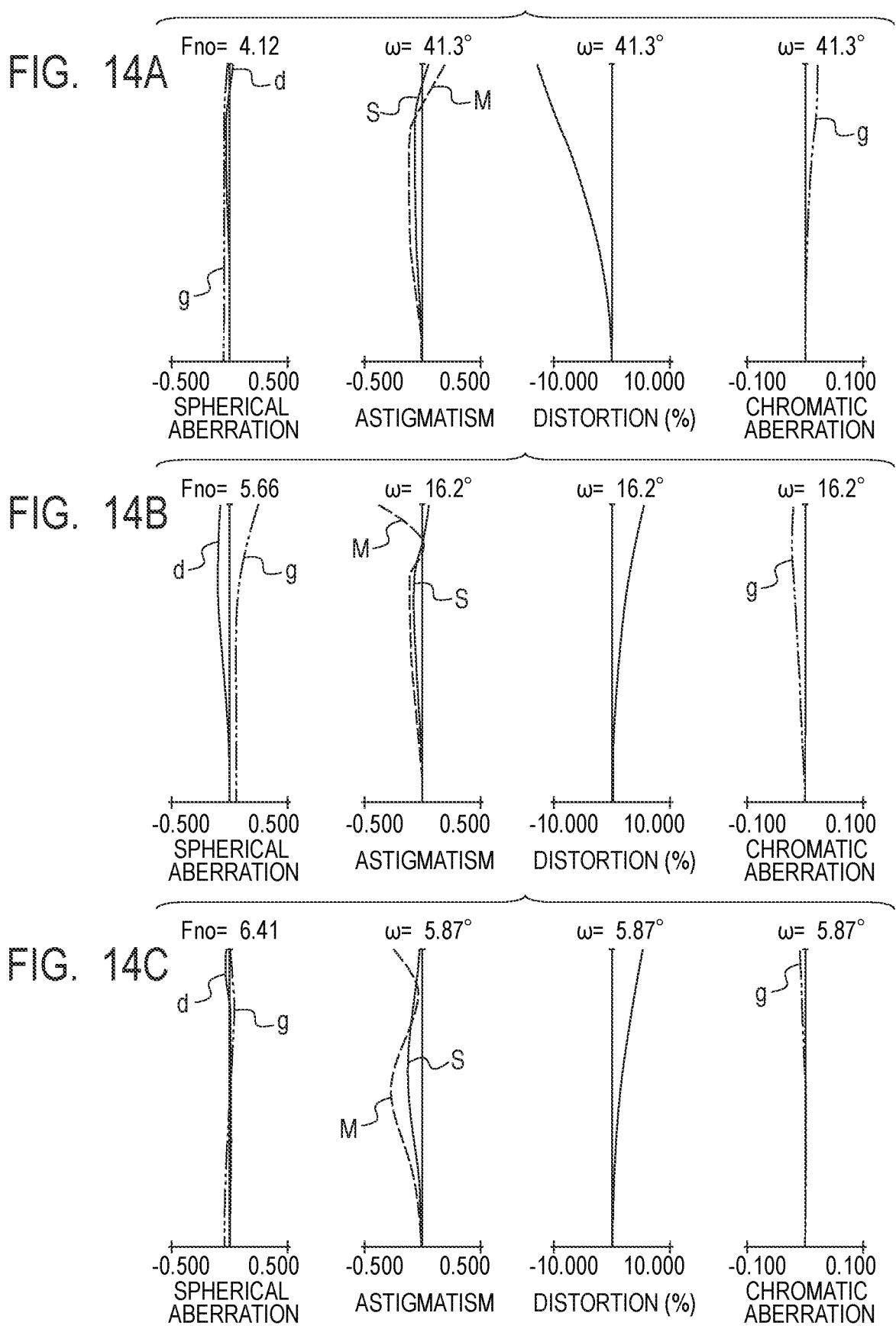
FIG. 14A is an aberration diagram of the zoom lens of Example 5 at the wide angle end.
FIG. 14B is an aberration diagram of the zoom lens of Example 5 at an intermediate zoom position.
FIG. 14C is an aberration diagram of the zoom lens of Example 5 at a telephoto end.
Figure 15:
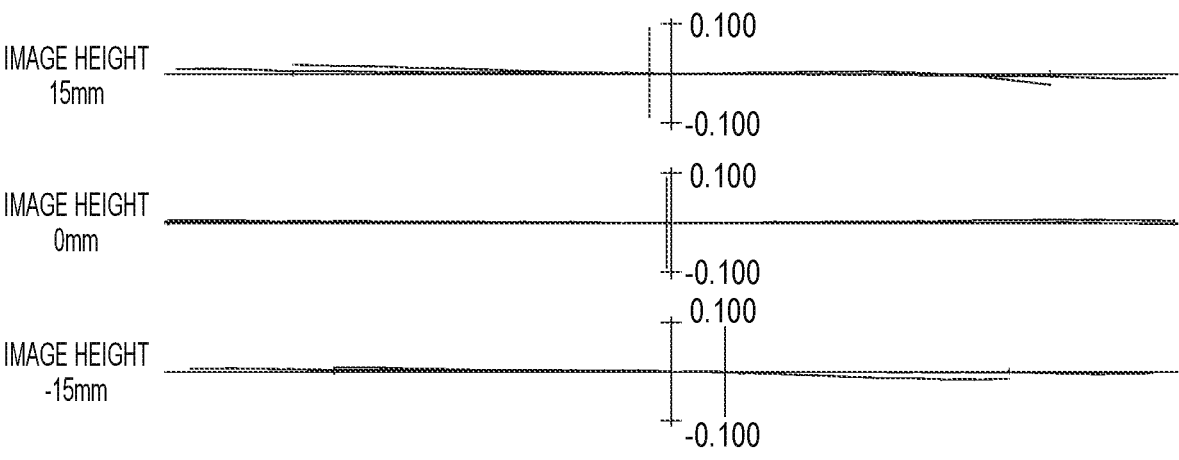
FIG. 15 is an aberration diagram of the zoom lens of Example 5 in image blurring correction at the telephoto end.

FIG. 13 is a lens cross-sectional view of the zoom lens of Example 5 of the present invention when focused at infinity at a wide angle end. FIGS. 14A, 14B, and 14C are longitudinal aberration diagrams of the zoom lens of Example 5 when focused at infinity at the wide angle end, an intermediate zoom position, and a telephoto end, respectively. FIG.

15 is a transverse aberration diagram after correction in which the second subunit for image blurring correction is moved by 0.437 mm in the zoom lens of Example 5 when focused at infinity at the telephoto end. The zoom lens of Example 5 has a zoom ratio of 8.09 and F-number of 4.12 to 6.41.

Figure 16:
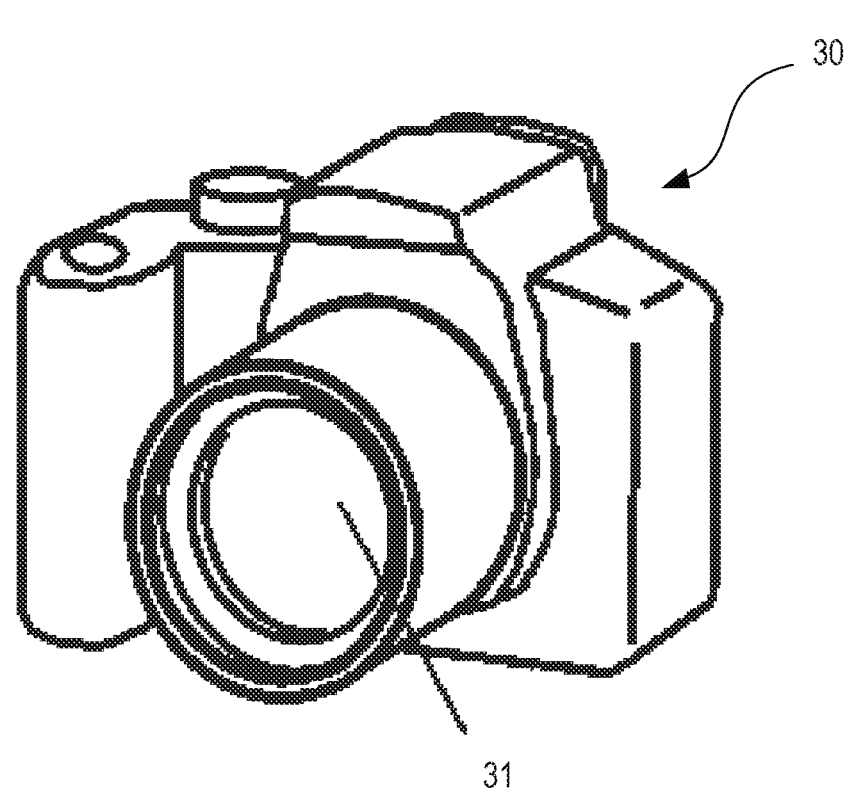
FIG. 16 is a schematic view of a main portion of an image pickup apparatus of the present invention.

FIG. 16 is a schematic view of a main portion of an image pickup apparatus of the present invention.

The zoom lens of each example is an image pickup optical system used for an image pickup apparatus such as a video camera, digital still camera, and monitoring camera. The zoom lens of each example may be used as a projection optical system for a projector. In each lens cross-sectional view, the left side is the object side (front side) and the right side is the image side (rear side).

In the lens cross-sectional view, L0 represents the zoom lens. Li represents an i-th lens unit. LR represents a rear group including one or more lens units. XYZ represents a correction lens unit including an image blurring correction unit for image blurring correction (for image stabilization). SP represents an aperture stop that determines (limits) the light flux of open F-number (Fno). IP represents an image plane, and there is set an image pickup surface of an image pickup element (photoelectric conversion element) such as a CCD sensor and CMOS sensor when the zoom lens of each example is used as an image pickup optical system of a video camera and digital still camera.

Arrows indicate movement loci of the lens units during zooming (magnification varying) from the wide angle end to the telephoto end. An arrow associated with focusing indicates a movement direction of a lens unit during focusing from the infinity to the close-distance.

In the longitudinal aberration diagram, Fno represents F-number, and w represents (a degree of) an image pickup half angle of view, which is an angle of view based on a ray trace value. In a spherical aberration diagram, d represents a d-line (with a wavelength of 587.6 nm), and g represents a g-line (with a wavelength of 435.8 nm). In an astigmatism diagram, S represents a sagittal image plane in the d-line, and M represents a meridional image plane in the d-line. Distortion is based on the d-line. In a lateral chromatic aberration diagram, g represents the g-line.

When refractive indexes of a material for a g-line (with a wavelength of 435.8 nm), an F-line (486.1 nm), a d-line (587.6 nm), and a C-line (656.3 nm) of the Fraunhofer lines are represented by Ng, NF, Nd, and NC, respectively, Abbe number vd of the material is expressed as "vd=(Nd−1)/(NF−NC)."

The zoom lenses of Examples 1, 2, and 3 each include the following lens units arranged in order from the object side to the image side. The lens units include a first lens unit L1 with a positive refractive power, a second lens unit L2 with a negative refractive power, a third lens unit L3 with a positive refractive power, and a rear group LR including two or more lens units. The rear group LR includes a fourth lens unit L4 with a positive refractive power, a fifth lens unit L5 with a negative refractive power, and a sixth lens unit L6 with a negative refractive power. The correction lens unit is the third lens unit L3. In the image blurring correction, the second subunit for image blurring correction including a cemented lens is moved in the direction having a component of a direction perpendicular to the optical axis.

The arrows indicate movement loci of the lens units during zooming from the wide angle end to the telephoto end. A solid line arrow 5a is a movement locus of the fifth lens unit L5 during zooming from the wide angle end to the telephoto end when focused at infinity. A dotted line arrow 5b is a movement locus of the fifth lens unit L5 during zooming from the wide angle end to the telephoto end when focused at the closest distance. During focusing from the infinity to the closest distance, the fifth lens unit L5 is moved toward the image side as indicated by the arrow 5c.

The zoom lenses in Examples 4 and 5 each include the following lens units arranged in order from the object side to the image side. The lens units include a first lens unit L1 with a positive refractive power, a second lens unit L2 with a negative refractive power, a third lens unit L3 with a positive refractive power, and a fourth lens unit L4 with a positive refractive power. The correction lens unit is the third lens unit L3. In the image blurring correction, the second subunit including a cemented lens is moved in the direction having a component of a direction perpendicular to the optical axis. The arrows indicate movement loci of the lens units during zooming from the wide angle end to the telephoto end. During focusing from the infinity to the closest distance, at least a part of the lenses in the fourth lens unit L4 is moved toward the image side.

Characteristics of the zoom lens of the present invention are described.

In the present invention, the correction lens unit XYZ with the image blurring correction unit (image stabilization unit) includes a first subunit X with a positive refractive power, a second subunit (image blurring correction unit) Y with a positive refractive power to be moved in the direction having a component of the vertical direction, and a third subunit Z with a negative refractive power. Further, a ratio of a focal length of the zoom lens L0 and a focal length of the correction lens unit XYZ when focused at infinity at the wide angle end is properly set.

Specifically, the focal length of the zoom lens L0 when focused at infinity at the wide angle end is represented by fw, and the focal length of the correction lens unit XYZ is represented by fxyz. In this case, the following conditional expression is satisfied:

$$0.01 < fxyz/fw < 4.55 \tag{1}.$$

The zoom lens of each example includes the correction lens unit XYZ with the image blurring correction unit. The correction lens unit XYZ includes the first subunit X with a positive refractive power, the second subunit Y with a positive refractive power for image blurring correction, and the third subunit Z with a negative refractive power. Optical effects of the correction lens unit XYZ are described.

In order to downsize the image stabilization mechanism, it is important to reduce the diameter of the second subunit Y as the image blurring correction unit. For this reason, the first subunit X with a positive refractive power is arranged on the object side of the second subunit Y for image blurring correction to achieve downsizing of the outer diameter of the second subunit Y. Additionally, the downsizing of the image stabilization mechanism becomes easy by reducing the movement amount in the image blurring correction. For this reason, the third subunit Z with a negative refractive power is arranged on the image side of the image blurring correction unit to increase the positive refractive power of the second subunit Y, so that the movement amount in the image blurring correction is suppressed.

The refractive powers of the first subunit X, second subunit Y, and third subunit Z are high, and thus the effect on the optical performance by decentering is large. For this reason, the mechanism is made such that the units are integrally moved during zooming, and thus the structurally stable optical performance is obtained from the wide angle end to the telephoto end.

Then, by satisfying the conditional expression (1), a zoom lens having a high zoom ratio and high optical performance over entire zoom range is obtained.

The conditional expression (1) defines a relationship between the focal length of the correction lens unit XYZ and that of the zoom lens at the wide angle end. By satisfying the conditional expression (1), downsizing and a high zoom ratio of the zoom lens are efficiently accomplished. When the ratio falls below the lower limit value in the conditional expression (1), the positive refractive power of the correction lens unit XYZ becomes too strong, and it becomes difficult to reduce variation of aberrations during zooming. When the ratio exceeds the upper limit value in the conditional expression (1), the positive refractive power of the correction lens unit XYZ becomes too weak, and it becomes difficult to effectively obtain a zoom ratio. More preferably, the numerical range of the conditional expression (1) may be set as follow:

$$1.00 < fxyz/fw < 4.30 \tag{1a}$$

In each example, the correction lens unit XYZ having an image stabilization function (image blurring correction function) includes an X-th lens unit with a positive refractive power, a Y-th lens unit with a positive refractive power, and a Z-th lens unit with a negative refractive power. Then, by satisfying the conditional expression (1), a zoom lens having a high zoom ratio and high optical performance over entire zoom range is obtained.

More preferably, one or more of the following conditional expressions may be satisfied in each example.

A focal length of the first subunit X is represented by fx, a focal length of the second subunit Y is represented by fy, and a focal length of the third subunit Z is represented by fz. A distance from a lens surface closest to the image side in the third subunit Z to a lens surface closest to the image side in the zoom lens is represented by lis, a curvature radius of a lens surface closest to the image side in the second subunit Y is represented by Ryz1, and a curvature radius of a lens surface closest to the object side in the third subunit Z is represented by Ryz2.

In this case, it is preferred to satisfy one or more of the following conditional expressions:

$$0.82 < fxyz/fy < 10.00 \tag{2}$$

$$-10.0 < fxyz/fz < -1.3 \tag{3}$$

$$0.60 < lis/fy < 50.00 \tag{4}$$

$$0.30 < fxyz/fx < 10.00 \tag{5}$$ and $$0.5 < (Ryz1+Ryz2)/(Ryz1-Ryz2) < 75.0 \tag{6}$$

Next, technical meanings of the above conditional expressions are described.

The conditional expression (2) defines a relationship between the focal length of the correction lens unit XYZ and the focal length of the second subunit Y. When the ratio falls below the lower limit value of the conditional expression (2), the positive refractive power of the second subunit Y becomes too weak, the movement amount in the vertical direction in the image blurring correction (image stabilization) becomes increased, and the image blurring correction mechanism (image stabilization mechanism) becomes enlarged. When the ratio exceeds the upper limit value of the conditional expression (2), the positive refractive power of the second subunit Y becomes too strong, and it becomes difficult to make highly accurate control of the movement in the vertical direction in the image blurring correction.

The conditional expression (3) defines a relationship between the focal length of the correction lens unit XYZ and the focal length of the third subunit Z. When the ratio falls below the lower limit value of the conditional expression (3), the negative refractive power of the third subunit Z becomes too strong (an absolute value of the negative refractive power becomes too large), the off-axial light flux becomes widely dispersed, and the effective diameter of a lens unit on the image side of the correction lens unit XYZ becomes enlarged. When the ratio exceeds the upper limit value of the conditional expression (3), the negative refractive power of the third subunit Z becomes too weak (an absolute value of the negative refractive power becomes too small), the effect of pushing the front principal point of the correction lens unit XYZ to the object side becomes decreased, and it becomes difficult to obtain a high zoom ratio.

The conditional expression (4) defines a relationship between the distance from the lens surface closest to the image side in the third subunit Z to the lens surface closest to the image side in the zoom lens L0 and the focal length of the second subunit Y. When the ratio falls below the lower limit value of the conditional expression (4), an incidence height of the off-axial ray on a lens surface at the image side of the correction lens unit XYZ becomes high, a space for arranging a lens unit at a position where the light flux is separated well becomes reduced, and it becomes difficult to correct aberrations. When the ratio exceeds the upper limit value of the conditional expression (4), the length of the lens unit on the image side of the correction lens unit XYZ becomes too long, and the total lens length of the zoom lens becomes increased.

The conditional expression (5) defines a relationship between the focal length of the correction lens unit XYZ and the focal length of the first subunit X. When the ratio falls below the lower limit value of the conditional expression (5), the positive refractive power of the first subunit X becomes too weak, and the effective diameter of the second subunit Y arranged on the image side becomes enlarged. When the ratio exceeds the upper limit value of the conditional expression (5), the positive refractive power of the first subunit X becomes too strong, and it becomes difficult to correct spherical aberration and coma aberration.

The conditional expression (6) defines a shape factor (lens shape) of an air lens between the second subunit Y and the third subunit Z. When the ratio exceeds the upper limit value of the conditional expression (6) or falls below the lower limit value thereof, the refractive power of the air lens between the second subunit Y and the third subunit Z becomes strong, and the variation of spherical aberration due to the variation of an air distance becomes large. Consequently, the variation of spherical aberration due to a manufacturing error becomes large, and it becomes difficult to achieve highly accurate manufacturing.

Note that, in each example, it is more preferable to set the numerical ranges of the conditional expressions (2) to (6) as follow:

$$1.0 < fxyz/fy < 4.0 \tag{2a}$$

$$-4.00 < fxyz/fz < -1.30 \tag{3a}$$

$$0.80 < lis/fy < 10.00 \tag{4a}$$

$$0.70 < fxyz/fx < 5.00 \tag{5a}$$ and $$0.8 < (Ryz1+Ryz2)/(Ryz1-Ryz2) < 20.0 \tag{6a}$$

Next, preferable configurations for the examples are described.

The zoom lenses of Examples 1 to 3 each include two or more lens units at the image side of the correction lens unit XYZ. An interval between respective lens units of these lens units is preferably varied during zooming. It becomes easy to reduce variation of off-axial aberration due to zooming by changing the interval between the lens units at a position where the on-axial light flux and the off-axial light flux are well separated.

In each example, it is preferred to arrange four or more lenses at the image side of the correction lens unit XYZ. It becomes easy to reduce variation of off-axial aberration due to zooming by arranging a plurality of lenses at a position where the on-axial light flux and the off-axial light flux are well separated. Further, it is preferred to arrange an aspheric lens at the image side of the correction lens unit XYZ. It becomes easy to reduce variation of off-axial aberration due to zooming by arranging an aspheric lens effective for aberration correction at a position where the off-axial light flux is high.

The second subunit Y preferably includes a positive lens and a negative lens. With this, it is easy to suppress chromatic aberration in the image blurring correction. The first subunit X preferably includes a positive lens and a negative lens. With this, it is easy to suppress chromatic aberration. All of the lenses forming the second subunit Y are preferably spherical lenses. With this, it is easy to process the lenses by polishing and is also easy to achieve high volume manufacturing.

The correction lens unit XYZ is preferably a third lens unit L3. It is desirable to move the front principal point position of the third lens unit L3 to the object side to achieve a high zoom ratio. It becomes easy to effectively implement a zoom lens unit having a high zoom ratio by setting the third lens unit L3 to the correction lens unit XYZ that is configured to move the front principal point position. Among the first subunit X, second subunit Y, and third subunit Z, the thickest subunit in the optical axis direction is preferably the first subunit X or the third subunit Z. It is unfavorable to make the second subunit Y as the thickest one because the image stabilization mechanism becomes large. The thickness of the subunit in the optical axis direction is a length from a lens surface closest to the object side in the subunit to a lens surface closest to the image side therein.

As described above, according to the present invention, it is easy to implement an image stabilization zoom lens having a high zoom ratio and high optical performance over entire zoom range.

Next, a configuration of the zoom lens of each example is described.

The zoom lenses of Examples 1, 2, and 3 each include the following lens units arranged in order from the object side to the image side. The lens units are the first lens unit L1 with a positive refractive power, the second lens unit L2 with a negative refractive power, the third lens unit L3 with a positive refractive power, and the rear group LR including two or more lens units. The rear group LR includes the fourth lens unit L4 with a positive refractive power, the fifth lens unit L5 with a negative refractive power, and the sixth lens unit L6 with a negative refractive power. The correction lens unit is the third lens unit L3.

In the image blurring correction, the second subunit for image blurring correction including a cemented lens is moved in the direction having a component of a direction perpendicular to the optical axis. During focusing from the infinity to the closest distance, the fifth lens unit L5 is moved toward the image side as indicated by the arrow 5c.

The zoom lenses in Examples 4 and 5 each include the following lens units arranged in order from the object side to the image side. The lens units are the first lens unit L1 with a positive refractive power, the second lens unit L2 with a negative refractive power, the third lens unit L3 with a positive refractive power, and a rear group LR including one or more lens unit. The rear group LR includes a fourth lens unit L4. The correction lens unit is the third lens unit L3. In the image blurring correction, the second subunit including a cemented lens is moved in the direction having a component of a direction perpendicular to the optical axis. During focusing from the infinity to the closest distance, at least a part of the lenses in the fourth lens unit L4 is moved toward the image side.

Note that, it is preferred for Examples 4 and 5 that the above-described conditional expressions (1) to (3) are concurrently satisfied.

Next, an image pickup apparatus using the zoom lens of the present invention is described with reference to FIG. 16.

In FIG. 16, the reference numeral 30 indicates a camera main body, and the reference numeral 31 indicates an image pickup optical system including any one of the zoom lenses described in Examples 1 to 5. An image pickup element (photoelectric conversion element) such as a CCD sensor and CMOS sensor that receives light of an object image formed by the image pickup optical system 31 is incorporated in the camera main body 30.

Although the preferable embodiments of the present invention are described above, the present invention is not limited to such embodiments, and various modifications and variations can be made within the scope of the gist. For example, the optical system may include not only a refractive optical element (such as a lens) but also a diffractive optical element.

Numerical Data 1 to 5 corresponding to Examples 1 to 5 are shown below. In the numerical data, ri represents a curvature radius of an i-th surface in order from the object side, di represents a lens thickness and an air interval between the i-th surface and an i+1-th surface in order from the object side, and ni and vi represent respectively a refractive index and Abbe number of material of an optical member between the i-th surface and the i+1-th surface in order from the object side. An aspheric shape where an X axis is in the optical axis direction, an H axis is in the direction perpendicular to the optical axis, a light traveling direction is positive, R is a paraxial curvature radius, k is a conic constant, and A4, A6, A8, A10, and A12 are aspheric coefficients is expressed as follow. Note that, "e−Z" means "$\times 10^{-z}$."

$$X = \frac{H^2/R}{1 + \sqrt{1 - (1+k)(H/R)^2}} + A4H^4 + A6H^6 + A8H^8 + A10H^{10} + A12H^{12}$$

A half angle of view indicates a half angle of view based on a ray trace value. BF represents back focus, which is an air-equivalent distance on the optical axis from the last lens surface to the imaging plane position without a glass block such as a face plate of a sensor and a low-pass filter on the image pickup plane side. The total lens length is a distance on the optical axis from a lens surface closest to the object side in the zoom lens to a lens surface closest to the image side therein, to which the back focus is added. Relationships between the above-described conditional expressions and the numerical values in the Numerical Data are shown in Table 1.

(Numerical Data 1)

[Unit mm]

Surface data

| Surface number | r | d | nd | vd | Effective diameter |
|---|---|---|---|---|---|
| 1 | 131.399 | 1.85 | 1.90366 | 31.3 | 56.83 |
| 2 | 68.561 | 8.49 | 1.49700 | 81.5 | 55.44 |
| 3 | −730.653 | 0.15 | | | 55.12 |
| 4 | 68.792 | 6.48 | 1.61800 | 63.4 | 53.52 |
| 5 | 664.437 | (variable) | | | 52.76 |
| 6 | 243.528 | 1.28 | 1.85150 | 40.8 | 27.59 |
| 7 | 20.583 | 4.73 | | | 22.38 |
| 8 | −56.381 | 1.09 | 1.85150 | 40.8 | 21.97 |
| 9 | 45.818 | 0.46 | | | 20.78 |
| 10 | 35.871 | 4.51 | 1.92286 | 20.9 | 20.58 |
| 11 | −61.247 | 0.84 | | | 19.64 |
| 12 | −32.368 | 1.03 | 1.77250 | 49.6 | 19.45 |
| 13 | 821.472 | (variable) | | | 18.64 |
| 14(stop) | ∞ | 0.35 | | | 16.32 |
| 15 | 27.034 | 3.05 | 1.76182 | 26.5 | 17.03 |
| 16 | −852.680 | 0.15 | | | 16.92 |
| 17 | 19.840 | 3.53 | 1.58144 | 40.8 | 16.65 |
| 18 | ∞ | 0.82 | 2.00100 | 29.1 | 15.95 |
| 19 | 20.522 | 2.70 | | | 15.21 |
| 20 | 35.803 | 0.80 | 2.00069 | 25.5 | 15.50 Second subunit |
| 21 | 18.888 | 3.99 | 1.72000 | 43.7 | 15.26 Second subunit |
| 22 | −63.451 | 2.27 | | | 15.19 Second subunit |
| 23 | −26.036 | 0.80 | 2.00100 | 29.1 | 14.80 |
| 24 | −164.761 | (variable) | | | 15.10 |
| 25* | 45.628 | 2.42 | 1.53110 | 55.9 | 21.58 |
| 26* | 246.555 | 0.90 | | | 22.57 |
| 27 | −170.519 | 1.25 | 1.85478 | 24.8 | 22.75 |
| 28 | 170.589 | 5.53 | 1.59282 | 68.6 | 23.82 |
| 29 | −26.647 | 0.15 | | | 25.08 |
| 30 | 45.538 | 6.19 | 1.49700 | 81.5 | 27.28 |
| 31 | −45.788 | (variable) | | | 27.38 |
| 32 | 93.245 | 1.81 | 1.80518 | 25.4 | 25.57 |
| 33 | 304.630 | 1.10 | 1.63854 | 55.4 | 25.27 |
| 34 | 23.508 | (variable) | | | 24.12 |
| 35 | −53.590 | 1.28 | 1.83481 | 42.7 | 27.19 |
| 36 | 53.854 | 4.88 | 1.84666 | 23.8 | 29.26 |
| 37 | −109.597 | (variable) | | | 30.00 |
| Image plane | ∞ | | | | |

Aspheric surface data

25th surface

K = 0.00000e+000
A4 = −3.69428e−006
A6 = −1.81514e−007
A8 = 1.12707e−009
A10 = −1.37724e−011
A12 = 4.19334e−014

26th surface

K = 0.00000e+000
A4 = 2.68822e−005
A6 = −1.85641e−007
A8 = 9.59349e−010
A10 = −1.18429e−011
A12 = 3.67346e−014

12

-continued

[Unit mm]

Various data
Zoom ratio 9.42

| | Wide angle | Intermediate | Telephoto |
|---|---|---|---|
| Focal length | 24.72 | 85.00 | 232.80 |
| F-number | 4.12 | 5.66 | 6.41 |
| Half angle of view (deg) | 37.55 | 14.28 | 5.31 |
| Image height | 19.00 | 21.64 | 21.64 |
| Total lens length | 142.00 | 183.82 | 214.00 |
| BF | 15.78 | 45.06 | 57.20 |
| d5 | 1.34 | 32.74 | 59.28 |
| d13 | 22.25 | 8.64 | 2.35 |
| d24 | 8.46 | 3.21 | 1.00 |
| d31 | 3.73 | 4.64 | 1.50 |
| d34 | 15.54 | 14.63 | 17.77 |
| d37 | 15.78 | 45.06 | 57.20 |
| Entrance pupil position | 30.57 | 98.84 | 259.37 |
| Exit pupil position | −58.97 | −44.91 | −42.49 |
| Front principal point position | 47.11 | 103.54 | −51.47 |
| Rear principal point position | −8.94 | −39.94 | −175.60 |

Lens unit data

| Unit | Start surface | Focal length | Lens structure length | Front principal point position | Rear principal point position |
|---|---|---|---|---|---|
| 1 | 1 | 103.63 | 16.97 | 5.21 | −5.67 |
| 2 | 6 | −16.74 | 13.94 | 2.74 | −6.83 |
| 3 | 14 | 60.67 | 18.47 | −20.76 | −25.35 |
| 4 | 25 | 22.87 | 16.44 | 7.17 | −4.32 |
| 5 | 32 | −53.51 | 2.91 | 2.47 | 0.75 |
| 6 | 35 | −138.27 | 6.16 | −3.59 | −7.12 |

Single lens data

| Lens | Start surface | Focal length |
|---|---|---|
| 1 | 1 | −160.90 |
| 2 | 2 | 126.56 |
| 3 | 4 | 123.65 |
| 4 | 6 | −26.47 |
| 5 | 8 | −29.54 |
| 6 | 10 | 25.07 |
| 7 | 12 | −40.29 |
| 8 | 15 | 34.45 |
| 9 | 17 | 34.12 |
| 10 | 18 | −20.50 |
| 11 | 20 | −40.92 |
| 12 | 21 | 20.63 |
| 13 | 23 | −30.98 |
| 14 | 25 | 104.98 |
| 15 | 27 | −99.60 |
| 16 | 28 | 39.29 |
| 17 | 30 | 47.00 |
| 18 | 32 | 166.25 |
| 19 | 33 | −39.95 |
| 20 | 35 | −32.00 |
| 21 | 36 | 43.24 |

(Numerical Data 2)

[Unit mm]

Surface data

| Surface number | r | d | nd | vd | Effective diameter |
|---|---|---|---|---|---|
| 1 | 112.147 | 2.40 | 1.90366 | 31.3 | 60.02 |
| 2 | 71.272 | 8.23 | 1.49700 | 81.5 | 58.49 |
| 3 | −7459.449 | 0.15 | | | 58.13 |
| 4 | 82.892 | 6.55 | 1.49700 | 81.5 | 56.63 |
| 5 | 1699.730 | (variable) | | | 55.86 |

-continued

| [Unit mm] | | | | | |
|---|---|---|---|---|---|
| 6 | −25607.668 | 1.75 | 1.85150 | 40.8 | 33.35 |
| 7 | 24.930 | 4.73 | | | 26.99 |
| 8 | −161.592 | 1.40 | 1.53775 | 74.7 | 26.79 |
| 9 | 24.230 | 3.97 | 1.89286 | 20.4 | 24.10 |
| 10 | 99.056 | 2.16 | | | 23.19 |
| 11 | −53.039 | 1.20 | 1.76385 | 48.5 | 22.96 |
| 12 | −1213.107 | (variable) | | | 22.21 |
| 13(stop) | ∞ | 0.40 | | | 18.09 |
| 14 | 32.991 | 3.12 | 1.57501 | 41.5 | 18.74 |
| 15 | −122.831 | 0.20 | | | 18.75 |
| 16 | 36.540 | 3.60 | 1.61293 | 37.0 | 18.62 |
| 17 | −48.962 | 1.00 | 1.95375 | 32.3 | 18.24 |
| 18 | 45.085 | 1.09 | | | 17.88 |
| 19 | 49.738 | 1.00 | 1.95375 | 32.3 | 18.01 Second subunit |
| 20 | 22.552 | 3.80 | 1.71999 | 50.2 | 17.78 Second subunit |
| 21 | −82.995 | 2.11 | | | 17.75 Second subunit |
| 22 | −25.563 | 2.91 | 1.95375 | 32.3 | 17.56 |
| 23 | −14.773 | 1.00 | 1.83400 | 37.2 | 17.94 |
| 24 | −118.315 | (variable) | | | 18.61 |
| 25* | 60.756 | 4.29 | 1.58313 | 59.4 | 23.59 |
| 26* | −39.177 | 1.52 | | | 23.95 |
| 27 | 29373.826 | 1.30 | 1.85478 | 24.8 | 24.93 |
| 28 | 74.143 | 9.06 | 1.49700 | 81.5 | 25.40 |
| 29 | −26.280 | (variable) | | | 26.82 |
| 30 | 77.159 | 2.67 | 2.00069 | 25.5 | 25.50 |
| 31 | −495.414 | 1.35 | 1.89190 | 37.1 | 25.21 |
| 32 | 29.373 | (variable) | | | 24.29 |
| 33 | −35.391 | 1.50 | 1.89190 | 37.1 | 25.90 |
| 34 | −357.011 | 0.15 | | | 28.05 |
| 35 | 229.921 | 3.11 | 1.89286 | 20.4 | 29.06 |
| 36 | −87.477 | (variable) | | | 29.70 |
| Image plane | ∞ | | | | |

Aspheric surface data

25th surface

K = 0.00000e+000
A4 = −3.15382e−006
A6 = 8.92401e−008
A8 = −2.62557e−010
A10 = 2.43136e−012
A12 = 1.92085e−015

26th surface

K = 0.00000e+000
A4 = 1.94447e−005
A6 = 8.00656e−008
A8 = −7.14666e−011
A10 = 9.56772e−013
A12 = 8.59893e−015

Various data
Zoom ratio 12.14

| | Wide angle | Intermediate | Telephoto |
|---|---|---|---|
| Focal length | 24.30 | 85.03 | 294.97 |
| F-number | 4.12 | 5.40 | 6.49 |
| Half angle of view (deg) | 37.76 | 14.28 | 4.19 |
| Image height | 18.82 | 21.64 | 21.64 |
| Total lens length | 148.20 | 195.38 | 239.44 |
| BF | 12.23 | 47.13 | 64.46 |
| d5 | 0.99 | 33.28 | 72.72 |
| d12 | 25.32 | 11.82 | 2.35 |
| d24 | 10.75 | 4.24 | 1.00 |
| d29 | 12.19 | 7.00 | 1.50 |
| d32 | 9.00 | 14.19 | 19.69 |
| d36 | 12.23 | 47.13 | 64.46 |

-continued

| [Unit mm] | | | |
|---|---|---|---|
| Entrance pupil position | 34.49 | 99.87 | 333.71 |
| Exit pupil position | −50.09 | −42.15 | −40.82 |
| Front principal point position | 49.32 | 103.92 | −197.75 |
| Rear principal point position | −12.07 | −37.90 | −230.51 |

Lens unit data

| Unit | Start surface | Focal length | Lens structure length | Front principal point position | Rear principal point position |
|---|---|---|---|---|---|
| 1 | 1 | 124.17 | 17.33 | 3.93 | −7.47 |
| 2 | 6 | −20.13 | 15.22 | 3.67 | −6.89 |
| 3 | 13 | 82.61 | 20.22 | −13.32 | −23.37 |
| 4 | 25 | 28.71 | 16.17 | 6.35 | −5.70 |
| 5 | 30 | −61.09 | 4.02 | 3.78 | 1.63 |
| 6 | 33 | −126.25 | 4.76 | −4.03 | −6.83 |

Single lens data

| Lens | Start surface | Focal length |
|---|---|---|
| 1 | 1 | −222.60 |
| 2 | 2 | 142.10 |
| 3 | 4 | 175.10 |
| 4 | 6 | −29.25 |
| 5 | 8 | −39.08 |
| 6 | 9 | 35.05 |
| 7 | 11 | −72.64 |
| 8 | 14 | 45.56 |
| 9 | 16 | 34.69 |
| 10 | 17 | −24.48 |
| 11 | 19 | −44.05 |
| 12 | 20 | 25.01 |
| 13 | 22 | 32.43 |
| 14 | 23 | −20.33 |
| 15 | 25 | 41.50 |
| 16 | 27 | −86.96 |
| 17 | 28 | 40.25 |
| 18 | 30 | 66.87 |
| 19 | 31 | −31.05 |
| 20 | 33 | −44.14 |
| 21 | 35 | 71.30 |

| [Unit mm] | | | | | |
|---|---|---|---|---|---|
| Surface data | | | | | |
| Surface number | r | d | nd | vd | Effective diameter |
| 1 | 148.153 | 2.40 | 1.90366 | 31.3 | 61.56 |
| 2 | 83.577 | 7.79 | 1.49700 | 81.5 | 57.24 |
| 3 | −490.175 | 0.15 | | | 56.64 |
| 4 | 80.287 | 6.18 | 1.49700 | 81.5 | 55.01 |
| 5 | 796.131 | (variable) | | | 54.25 |
| 6 | −3122.129 | 1.75 | 1.76385 | 48.5 | 36.00 |
| 7 | 27.840 | 5.70 | | | 29.06 |
| 8 | −75.750 | 1.40 | 1.62299 | 58.2 | 28.81 |
| 9 | 29.610 | 4.42 | 1.89286 | 20.4 | 26.18 |
| 10 | 648.455 | 1.90 | | | 25.39 |
| 11 | −51.882 | 1.20 | 1.85150 | 40.8 | 25.15 |
| 12 | −624.426 | (variable) | | | 24.52 |
| 13 | 35.434 | 2.93 | 1.91082 | 35.3 | 19.41 |
| 14 | −266.163 | 2.00 | | | 19.31 |
| 15(stop) | ∞ | 0.40 | | | 18.88 |
| 16 | 33.105 | 3.37 | 1.63980 | 34.5 | 18.53 |
| 17 | −79.195 | 1.00 | 2.00100 | 29.1 | 18.00 |
| 18 | 34.317 | 1.00 | | | 17.37 |
| 19 | 31.580 | 1.00 | 2.00069 | 25.5 | 17.42 Second subunit |
| 20 | 20.327 | 3.84 | 1.56732 | 42.8 | 16.99 Second subunit |
| 21 | −76.058 | 1.74 | | | 16.86 Second subunit |

-continued

| [Unit mm] | | | | |
|---|---|---|---|---|
| 22 | −30.079 | 1.00 | 2.00069 25.5 | 16.57 |
| 23 | −155.512 | (variable) | | 16.87 |
| 24* | −74.310 | 3.44 | 1.58313 59.4 | 21.36 |
| 25* | −34.273 | 0.20 | | 22.97 |
| 26 | 39.846 | 1.30 | 1.85478 24.8 | 26.51 |
| 27 | 34.988 | 8.87 | 1.49700 81.5 | 26.68 |
| 28 | −25.036 | (variable) | | 27.39 |
| 29 | 64.769 | 3.33 | 1.92286 18.9 | 25.63 |
| 30 | 180.862 | 1.50 | 1.85026 32.3 | 24.98 |
| 31 | 26.561 | (variable) | | 23.93 |
| 32 | −34.248 | 1.50 | 1.77250 49.6 | 24.73 |
| 33 | 107.284 | 4.37 | 1.80810 22.8 | 27.28 |
| 34 | −68.045 | (variable) | | 28.33 |
| Image plane | ∞ | | | |

Aspheric surface data

24th surface

K = 0.00000e+000
A4 = −9.56903e−006
A6 = 1.26358e−007
A8 = 6.11715e−010
A10 = −2.29266e−012
A12 = 5.49746e−015

25th surface

K = 0.00000e+000
A4 = 1.45787e−005
A6 = 1.29156e−007
A8 = 3.25600e−010
A10 = 1.99326e−012
A12 = −9.32881e−015

Various data
Zoom ratio 11.33

| | Wide angle | Intermediate | Telephoto |
|---|---|---|---|
| Focal length | 24.72 | 87.83 | 280.00 |
| F-number | 4.12 | 5.40 | 6.49 |
| Half angle of view (deg) | 37.29 | 13.84 | 4.42 |
| Image height | 18.82 | 21.64 | 21.64 |
| Total lens length | 146.84 | 194.45 | 231.80 |
| BF | 13.49 | 49.18 | 65.84 |
| d5 | 1.33 | 35.55 | 71.95 |
| d12 | 27.60 | 13.52 | 1.50 |
| d23 | 13.67 | 5.46 | 1.77 |
| d28 | 7.79 | 2.15 | 1.50 |
| d31 | 7.28 | 12.93 | 13.57 |
| d34 | 13.49 | 49.18 | 65.84 |
| Entrance pupil position | 36.46 | 108.60 | 309.53 |
| Exit pupil position | −48.43 | −37.10 | −33.12 |
| Front principal point position | 51.31 | 107.02 | −202.74 |
| Rear principal point position | −11.23 | −38.65 | −214.16 |

Lens unit data

| Unit | Start surface | Focal length | Lens structure length | Front principal point position | Rear principal point position |
|---|---|---|---|---|---|
| 1 | 1 | 128.59 | 16.52 | 4.50 | −6.33 |
| 2 | 6 | −20.97 | 16.37 | 4.35 | −7.07 |
| 3 | 13 | 59.10 | 18.27 | −18.04 | −23.67 |
| 4 | 24 | 26.10 | 13.81 | 5.94 | −3.44 |
| 5 | 29 | −58.80 | 4.83 | 4.82 | 2.11 |
| 6 | 32 | −105.51 | 5.87 | −4.12 | −7.68 |

Single lens data

| Lens | Start surface | Focal length |
|---|---|---|
| 1 | 1 | −216.00 |
| 2 | 2 | 144.32 |
| 3 | 4 | 179.15 |

-continued

| [Unit mm] | | |
|---|---|---|
| 4 | 6 | −36.12 |
| 5 | 8 | −34.00 |
| 6 | 9 | 34.63 |
| 7 | 11 | −66.51 |
| 8 | 13 | 34.49 |
| 9 | 16 | 36.92 |
| 10 | 17 | −23.81 |
| 11 | 19 | −59.66 |
| 12 | 20 | 28.69 |
| 13 | 22 | −37.42 |
| 14 | 24 | 105.74 |
| 15 | 26 | −383.00 |
| 16 | 27 | 30.88 |
| 17 | 29 | 107.86 |
| 18 | 30 | −36.78 |
| 19 | 32 | −33.45 |
| 20 | 33 | 52.10 |

(Numerical Data 4)

| [Unit mm] | | | | | |
|---|---|---|---|---|---|
| Surface data | | | | | |
| Surface number | r | d | nd | vd | Effective diameter |
| 1 | 128.115 | 1.85 | 1.90366 | 31.3 | 56.17 |
| 2 | 67.850 | 8.48 | 1.49700 | 81.5 | 53.93 |
| 3 | −848.648 | 0.15 | | | 52.86 |
| 4 | 69.496 | 6.47 | 1.61800 | 63.4 | 50.67 |
| 5 | 734.010 | (variable) | | | 49.67 |
| 6 | 226.907 | 1.28 | 1.85150 | 40.8 | 27.52 |
| 7 | 20.526 | 4.75 | | | 22.32 |
| 8 | −55.725 | 1.09 | 1.85150 | 40.8 | 21.88 |
| 9 | 45.678 | 0.47 | | | 20.69 |
| 10 | 35.586 | 4.47 | 1.92286 | 20.9 | 20.48 |
| 11 | −62.908 | 0.83 | | | 19.56 |
| 12 | −32.549 | 1.03 | 1.77250 | 49.6 | 19.39 |
| 13 | 905.300 | (variable) | | | 18.59 |
| 14(stop) | ∞ | 0.35 | | | 16.00 |
| 15 | 27.258 | 2.94 | 1.76182 | 26.5 | 16.72 |
| 16 | −610.228 | 0.15 | | | 16.64 |
| 17 | 19.523 | 3.46 | 1.58144 | 40.8 | 16.43 |
| 18 | −2584.417 | 0.82 | 2.00100 | 29.1 | 15.78 |
| 19 | 20.598 | 3.14 | | | 15.08 |
| 20 | 35.168 | 0.80 | 2.00069 | 25.5 | 15.48 Second subunit |
| 21 | 18.654 | 4.41 | 1.72000 | 43.7 | 15.25 Second subunit |
| 22 | −62.705 | 2.28 | | | 15.18 Second subunit |
| 23 | −25.704 | 0.80 | 2.00100 | 29.1 | 14.81 |
| 24 | −155.056 | (variable) | | | 15.13 |
| 25* | 46.862 | 2.35 | 1.53110 | 55.9 | 20.19 |
| 26* | 236.522 | 1.47 | | | 21.12 |
| 27 | −170.780 | 1.25 | 1.85478 | 24.8 | 21.81 |
| 28 | 168.818 | 5.25 | 1.59282 | 68.6 | 22.81 |
| 29 | −26.654 | 0.15 | | | 24.05 |
| 30 | 45.782 | 5.87 | 1.49700 | 81.5 | 26.03 |
| 31 | −44.943 | 3.73 | | | 26.16 |
| 32 | 93.760 | 1.77 | 1.80518 | 25.4 | 24.75 |
| 33 | 295.340 | 1.10 | 1.63854 | 55.4 | 24.46 |
| 34 | 23.670 | 15.54 | | | 23.46 |
| 35 | −49.488 | 1.28 | 1.83481 | 42.7 | 26.82 |
| 36 | 46.339 | 5.24 | 1.84666 | 23.8 | 29.16 |
| 37 | −108.890 | (variable) | | | 29.94 |
| Image plane | ∞ | | | | |

Aspheric surface data

25th surface

K = 0.00000e+000
A4 = −5.38146e−006
A6 = −1.99278e−007
A8 = 1.59495e−009

-continued

[Unit mm]

A10 = −1.74446e−011
A12 = 5.35029e−014
26th surface

K = 0.00000e+000
A4 = 2.56829e−005
A6 = −1.88110e−007
A8 = 8.93504e−010
A10 = −9.70722e−012
A12 = 2.66029e−014

Various data
Zoom ratio 8.09

| | Wide angle | Intermediate | Telephoto |
|---|---|---|---|
| Focal length | 24.72 | 70.34 | 200.00 |
| F-number | 4.12 | 5.66 | 6.41 |
| Half angle of view (deg) | 37.55 | 17.10 | 6.17 |
| Image height | 19.00 | 21.64 | 21.64 |
| Total lens length | 142.00 | 177.40 | 209.67 |
| BF | 14.77 | 40.58 | 55.81 |
| d5 | 1.31 | 27.34 | 54.98 |
| d13 | 22.18 | 10.46 | 2.35 |
| d24 | 8.72 | 3.99 | 1.50 |
| d37 | 14.77 | 40.58 | 55.81 |
| Entrance pupil position | 30.54 | 82.61 | 215.31 |
| Exit pupil position | −58.92 | −46.62 | −42.06 |
| Front principal point position | 46.97 | 96.21 | 6.64 |
| Rear principal point position | −9.95 | −29.76 | −144.19 |

Lens unit data

| Unit | Start surface | Focal length | Lens structure length | Front principal point position | Rear principal point position |
|---|---|---|---|---|---|
| 1 | 1 | 103.55 | 16.95 | 5.16 | −5.71 |
| 2 | 6 | −16.73 | 13.92 | 2.75 | −6.82 |
| 3 | 14 | 57.15 | 19.16 | −19.47 | −24.84 |
| 4 | 25 | 31.43 | 44.99 | −4.88 | −33.15 |

Single lens data

| Lens | Start surface | Focal length |
|---|---|---|
| 1 | 1 | −161.98 |
| 2 | 2 | 126.80 |
| 3 | 4 | 123.75 |
| 4 | 6 | −26.58 |
| 5 | 8 | −29.33 |
| 6 | 10 | 25.18 |
| 7 | 12 | −40.65 |
| 8 | 15 | 34.32 |
| 9 | 17 | 33.34 |
| 10 | 18 | −20.41 |
| 11 | 20 | −40.68 |
| 12 | 21 | 20.43 |
| 13 | 23 | −30.88 |
| 14 | 25 | 109.57 |
| 15 | 27 | −99.15 |
| 16 | 28 | 39.22 |
| 17 | 30 | 46.63 |
| 18 | 32 | 169.94 |
| 19 | 33 | −40.36 |
| 20 | 35 | −28.49 |
| 21 | 36 | 39.00 |

(Numerical Data 5)

[Unit mm]

Surface data

| Surface number | r | d | nd | vd | Effective diameter | |
|---|---|---|---|---|---|---|
| 1 | 120.412 | 1.85 | 1.90366 | 31.3 | 57.08 | |
| 2 | 66.203 | 8.65 | 1.49700 | 81.5 | 54.75 | |
| 3 | −901.353 | 0.15 | | | 53.72 | |
| 4 | 67.844 | 6.55 | 1.61800 | 63.3 | 51.08 | |
| 5 | 636.631 | (variable) | | | 50.06 | |
| 6 | 248.838 | 1.28 | 1.85150 | 40.8 | 27.07 | |
| 7 | 19.861 | 4.86 | | | 21.83 | |
| 8 | −55.253 | 1.09 | 1.85150 | 40.8 | 21.14 | |
| 9 | 47.170 | 0.61 | | | 19.99 | |
| 10 | 34.885 | 4.19 | 1.92286 | 20.9 | 19.71 | |
| 11 | −66.547 | 0.93 | | | 18.79 | |
| 12 | −30.461 | 1.03 | 1.77250 | 49.6 | 18.61 | |
| 13 | 672.724 | (variable) | | | 17.84 | |
| 14(stop) | ∞ | 0.35 | | | 15.91 | |
| 15 | 31.737 | 2.87 | 1.76182 | 26.5 | 16.57 | |
| 16 | −168.821 | 0.15 | | | 16.58 | |
| 17 | 19.509 | 3.28 | 1.56732 | 42.8 | 16.46 | |
| 18 | 309.261 | 0.82 | 2.00100 | 29.1 | 15.89 | |
| 19 | 22.249 | 2.53 | | | 15.28 | |
| 20 | 34.965 | 0.80 | 2.00069 | 25.5 | 15.55 | Second subunit |
| 21 | 18.128 | 5.07 | 1.72000 | 43.7 | 15.29 | Second subunit |
| 22 | −63.323 | 2.25 | | | 15.17 | Second subunit |
| 23 | −26.498 | 0.80 | 2.00100 | 29.1 | 14.77 | |
| 24 | −111.847 | (variable) | | | 15.04 | |
| 25* | 57.849 | 1.82 | 1.53110 | 55.9 | 17.53 | |
| 26* | 91.586 | 2.04 | | | 18.30 | |
| 27 | −134.898 | 1.25 | 1.85478 | 24.8 | 19.25 | |
| 28 | 177.492 | 4.98 | 1.59282 | 68.6 | 20.24 | |
| 29 | −29.167 | 0.15 | | | 21.89 | |
| 30 | 45.030 | 5.73 | 1.49700 | 81.5 | 24.04 | |
| 31 | −37.220 | 3.73 | | | 24.37 | |
| 32 | 78.768 | 1.73 | 1.80518 | 25.4 | 23.67 | |
| 33 | 190.055 | 1.10 | 1.61772 | 49.8 | 23.43 | |
| 34 | 24.341 | 15.54 | | | 22.72 | |
| 35 | −50.217 | 1.28 | 1.83481 | 42.7 | 26.43 | |
| 36 | 46.993 | 6.31 | 1.84666 | 23.8 | 28.71 | |
| 37 | −110.119 | (variable) | | | 30.00 | |
| Image plane | ∞ | | | | | |

Aspheric surface data

25th surface

K = 0.00000e+000
A4 = 3.84212e−006
A6 = 1.72590e−007
A8 = −8.11091e−009
A10 = 9.58508e−011
A12 = −4.31421e−013
26th surface K = 0.00000e+000
A4 = 3.30206e−005
A6 = 1.41088e−007
A8 = −7.15728e−009
A10 = 7.88180e−011
A12 = −3.28895e−013

Various data
Zoom ratio 8.09

| | Wide angle | Intermediate | Telephoto |
|---|---|---|---|
| Focal length | 24.72 | 70.54 | 200.00 |
| F-number | 4.12 | 5.66 | 6.41 |
| Half angle of view (deg) | 37.55 | 17.05 | 6.17 |
| Image height | 19.00 | 21.64 | 21.64 |
| Total lens length | 142.00 | 177.64 | 209.47 |
| BF | 14.51 | 41.28 | 57.00 |
| d5 | 1.32 | 27.03 | 53.37 |

-continued

| [Unit mm] | | | |
|---|---|---|---|
| d13 | 21.97 | 10.37 | 2.35 |
| d24 | 8.45 | 3.20 | 1.00 |
| d37 | 14.51 | 41.28 | 57.00 |
| Entrance pupil position | 30.54 | 83.88 | 217.72 |
| Exit pupil position | −58.88 | −47.16 | −43.43 |
| Front principal point position | 46.93 | 98.15 | 19.44 |
| Rear principal point position | −10.21 | −29.26 | −143.00 |

Lens unit data

| Unit | Start surface | Focal length | Lens structure length | Front principal point position | Rear principal point position |
|---|---|---|---|---|---|
| 1 | 1 | 99.97 | 17.20 | 5.05 | −5.99 |
| 2 | 6 | −15.59 | 13.99 | 2.90 | −6.76 |
| 3 | 14 | 45.63 | 18.91 | −12.04 | −19.97 |
| 4 | 25 | 38.31 | 45.66 | −3.72 | −33.76 |

Single lens data

| Lens | Start surface | Focal length |
|---|---|---|
| 1 | 1 | −165.41 |
| 2 | 2 | 124.46 |
| 3 | 4 | 122.34 |
| 4 | 6 | −25.41 |
| 5 | 8 | −29.74 |
| 6 | 10 | 25.30 |
| 7 | 12 | −37.70 |
| 8 | 15 | 35.29 |
| 9 | 17 | 36.55 |
| 10 | 18 | −23.98 |
| 11 | 20 | −38.53 |
| 12 | 21 | 20.10 |
| 13 | 23 | −34.85 |
| 14 | 25 | 290.26 |
| 15 | 27 | −89.50 |
| 16 | 28 | 42.64 |
| 17 | 30 | 41.97 |
| 18 | 32 | 165.92 |
| 19 | 33 | −45.31 |
| 20 | 35 | −28.91 |
| 21 | 36 | 39.63 |

TABLE 1

| Parameter/Conditional expression | Example | | | | |
|---|---|---|---|---|---|
| | 1 | 2 | 3 | 4 | 5 |
| fw | 24.72 | 24.30 | 24.72 | 24.72 | 24.72 |
| fxyz | 60.67 | 82.61 | 59.10 | 57.15 | 45.63 |
| fx | 55.81 | 72.56 | 50.05 | 54.37 | 48.46 |
| fy | 41.45 | 57.70 | 56.02 | 40.77 | 41.48 |
| fz | −30.98 | −47.17 | −37.42 | −30.88 | −34.85 |
| lis | 53.25 | 56.90 | 53.25 | 53.71 | 54.10 |
| Ryz1 | −63.45 | −83.00 | −76.06 | −62.70 | −63.32 |
| Ryz2 | −26.04 | −25.56 | −30.08 | −25.70 | −26.50 |
| (1)fxyz/fw | 2.45 | 3.40 | 2.39 | 2.31 | 1.85 |
| (2)fxyz/fy | 1.46 | 1.43 | 1.06 | 1.40 | 1.10 |
| (3)fxyz/fz | −1.96 | −1.75 | −1.58 | −1.85 | −1.31 |
| (4)lis/fy | 1.28 | 0.99 | 0.95 | 1.32 | 1.30 |
| (5)fxyz/fx | 1.09 | 1.14 | 1.18 | 1.05 | 0.94 |
| (6)(Ryz1 + Ryz2)/ (Ryz1 − Ryz2) | 2.39 | 1.89 | 2.31 | 2.39 | 2.44 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-207200, filed Nov. 2, 2018, which is hereby incorporated by reference herein in its entirety.

What is claimed is:

1. A zoom lens including a plurality of lens units, an interval between adjacent lens units of the plurality of lens units being varied during zooming, the plurality of lens units comprising:

a first lens unit with a positive refractive power;

a second lens unit with a negative refractive power;

a third lens unit with a positive refractive power; and a rear group consisting of three lens units having a lens unit B and a lens unit FA, the first lens unit, the second lens unit, the third lens unit and the rear group being arranged in order from an object side to an image side, wherein the first lens unit consists of a negative lens, a positive lens and a positive lens arranged in order from the object side to the image side, wherein the second lens unit consists of a negative lens, a negative lens, a positive lens and a negative lens arranged in order from the object side to the image side, wherein the third lens unit includes three positive lenses, wherein a lens unit arranged closest to the image side in the zoom lens consists of a negative lens and a positive lens arranged in order from the object side to the image side, wherein at least a subunit included in the plurality of lens units moves in a direction having a component of a direction perpendicular to an optical axis during an image blurring correction, wherein the lens unit FA moves toward the image side during focusing from an infinity to a closest distance, the lens unit FA being arranged adjacent to the lens unit arranged closest to the image side in the zoom lens and having a negative refractive power, wherein the lens unit B has a positive refractive power, and consists of a positive lens A, a negative lens B and a positive lens C arranged in order from the object side to the image side, the lens unit B being arranged at the object side of the lens unit FA, and wherein the following inequality is satisfied:

$$3.40 \leq fxyz/fw < 4.55$$

where fw is a focal length of the zoom lens when focused at infinity at a wide angle end and fxyz is a focal length of the third lens unit.

2. The zoom lens according to claim 1, wherein the positive lens included in the lens unit arranged closest to the image side in the zoom lens has a biconvex shape.

3. The zoom lens according to claim 2, wherein the negative lens included in the lens unit arranged closest to the image side in the zoom lens has a meniscus shape which is concave toward the object side.

4. The zoom lens according to claim 3, wherein each of the positive lens and the negative lens included in the lens unit arranged closest to the image side in the zoom lens is a single lens.

5. The zoom lens according to claim 1, wherein the negative lens B and the positive lens C are cemented with each other.

6. The zoom lens according to claim 1, wherein the following inequality is satisfied:

$$3.40 \leq fxyz/fw < 4.30.$$

7. The zoom lens according to claim 1, wherein the following inequality is satisfied:

$$1.0 < fxyz/fy < 1.43$$

where fy is a focal length of the subunit.

8. The zoom lens according to claim 1, wherein the following inequality is satisfied:

$$0.8 < (Ryz1 + Ryz2)/(Ryz1 - Ryz2) < 1.89$$

where Ryz1 is a curvature radius of a lens surface arranged closest to the image side in the subunit, and Ryz2 is a curvature radius of a lens surface on the object side in a lens which is arranged adjacent to the subunit at the image side.

9. An image pickup apparatus comprising:

a zoom lens including a plurality of lens units, an interval between adjacent lens units of the plurality of lens units being varied during zooming; and an image pickup element receiving light of an image formed by the zoom lens, the plurality of lens units including:

a first lens unit with a positive refractive power;

a second lens unit with a negative refractive power;

a third lens unit with a positive refractive power; and a rear group consisting of three lens units having a lens unit B and a lens unit FA, the first lens unit, the second lens unit, the third lens unit and the rear group being arranged in order from an object side to an image side, wherein the first lens unit consists of a negative lens, a positive lens and a positive lens arranged in order from the object side to the image side, wherein the second lens unit consists of a negative lens, a negative lens, a positive lens and a negative lens arranged in order from the object side to the image side, wherein the third lens unit includes three positive lenses, wherein a lens unit arranged closest to the image side in the zoom lens consists of a negative lens and a positive lens arranged in order from the object side to the image side, wherein at least a subunit included in the plurality of lens units moves in a direction having a component of a direction perpendicular to an optical axis during an image blurring correction, wherein the lens unit FA moves toward the image side during focusing from an infinity to a closest distance, the lens unit FA being arranged adjacent to the lens unit arranged closest to the image side in the zoom lens and having a negative refractive power, wherein the lens unit B has a positive refractive power, and consists of a positive lens A, a negative lens B and a positive lens C arranged in order from the object side to the image side, the lens unit B being arranged at the object side of the lens unit FA, and wherein the following inequality is satisfied:

$$3.40 \leq fxyz/fw < 4.55$$

where fw is a focal length of the zoom lens when focused at infinity at a wide angle end and fxyz is a focal length of the third lens unit.

10. The image pickup apparatus according to claim 9, wherein the positive lens included in the lens unit arranged closest to the image side in the zoom lens has a biconvex shape.

11. The image pickup apparatus according to claim 10, wherein the negative lens included in the lens unit arranged closest to the image side in the zoom lens has a meniscus shape which is concave toward the object side.

12. The image pickup apparatus according to claim 11, wherein each of the positive lens and the negative lens included in the lens unit arranged closest to the image side in the zoom lens is a single lens.

* * * * *